(12) United States Patent
Murase et al.

US007925142B2

(10) Patent No.: US 7,925,142 B2
(45) Date of Patent: Apr. 12, 2011

(54) APPARATUS FOR PRESENTING INFORMATION AND METHOD THEREOF

(75) Inventors: Kentaro Murase, Ashiya (JP); Kazuhiro Watanabe, Kobe (JP)

(73) Assignee: Fujitsu Limited, Kawasaki (JP)

( * ) Notice: Subject to any disclaimer, the term of this patent is extended or adjusted under 35 U.S.C. 154(b) by 1665 days.

(21) Appl. No.: 11/184,997

(22) Filed: Jul. 20, 2005

(65) Prior Publication Data
US 2006/0209212 A1    Sep. 21, 2006

(30) Foreign Application Priority Data
Mar. 16, 2005    (JP) .................................. 2005-074312

(51) Int. Cl.
*H04N 5/93*    (2006.01)
*H04N 9/80*    (2006.01)
*G06K 9/00*    (2006.01)

(52) U.S. Cl. .................... 386/353; 382/114; 386/239

(58) Field of Classification Search .................... 382/114
See application file for complete search history.

(56) References Cited

U.S. PATENT DOCUMENTS
7,466,875 B1 *  12/2008  Siegel et al. .................. 382/286
7,675,641 B2 *   3/2010  Cui et al. ..................... 358/1.15

FOREIGN PATENT DOCUMENTS
JP    2001-209645    8/2001

* cited by examiner

*Primary Examiner* — Marsha D Banks Harold
*Assistant Examiner* — Marc Dazenski
(74) *Attorney, Agent, or Firm* — Kratz, Quintos & Hanson, LLP

(57) ABSTRACT

An information presenting apparatus, based on display status on a screen, estimates text blocks that a user is likely to classify as poor-legibility blocks and is likely to wish to be read aloud. A simple device that allows selecting from the text blocks is provided. A poor-legibility-block extractor divides text to be displayed on the screen into blocks corresponding to individual text blocks, classifies blocks including characters of sizes less than or equal to a predetermined size as poor-legibility blocks, and assigns block numbers to the poor-legibility blocks. A document display unit displays areas of the respective poor-legibility blocks as distinguished from other areas, with block numbers assigned to the respective poor-legibility blocks. When the user presses a numeric key corresponding to a block number, text in the corresponding block is read aloud.

12 Claims, 35 Drawing Sheets

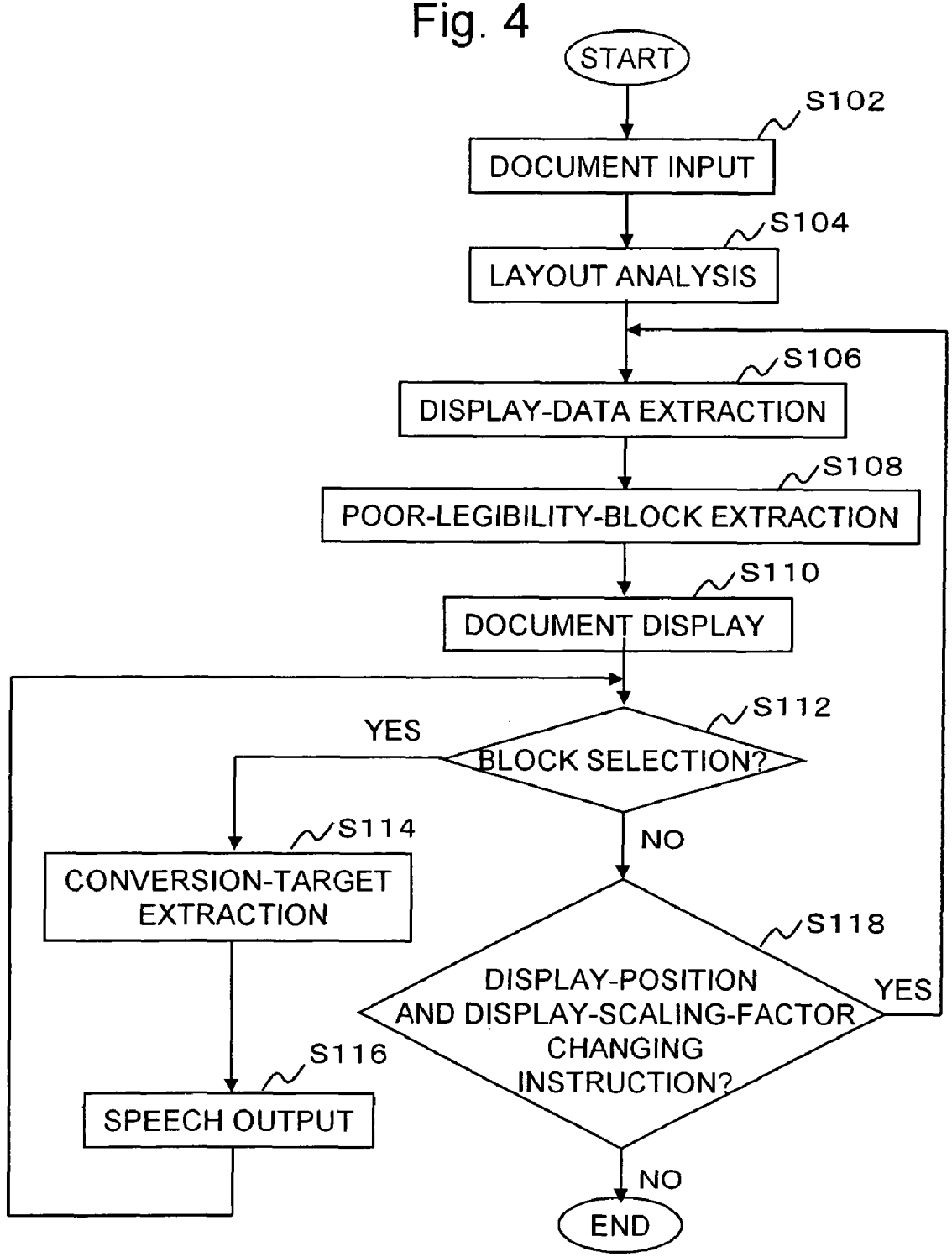

Fig. 5A

| text block 1 | start address 1 | end address 1 | text block 2 | start address 2 | end address 2 | ... |
|---|---|---|---|---|---|---|

Fig. 5B

| text block 1 | top-left coordinates 1 | bottom-right coordinates 1 | text block 2 | top-left coordinates 2 | bottom-right coordinates 2 | ... |
|---|---|---|---|---|---|---|

Fig. 6A

| Component 1 | top-left coordinates 1 | bottom-right coordinates 1 | Component 2 | top-left coordinates 2 | bottom-right coordinates 2 | ... |
|---|---|---|---|---|---|---|

Fig. 6B

| Component 1 | top-left coordinates 1 | bottom-right coordinates 1 | start address 1 | end address 1 | Component 2 | top-left coordinates 2 | bottom-right coordinates 2 | start address 2 | end address 2 | ... |
|---|---|---|---|---|---|---|---|---|---|---|

Fig. 7

| block number 1 | top-left coordinates 1 | bottom-right coordinates 1 | start address 1 | end address 1 | block number 2 | top-left coordinates 2 | bottom-right coordinates 2 | start address 2 | end address 2 | ... |

Fig. 8

Ultra-High-Speed Optical Switch Capable of Optical Amplification
--Ultra-high-speed optical signal processing at 640 gigabits per second demonstrated--

[Background of Development]

Signal processing that is based on physical properties of light (optical signal processing) has the possibility of achieving processing with high-speed and high-capacity by a factor of 100 to 1,000 or even higher compared with conventional electronic signal processing.

In the past, the development of erbium doped fiber amplifier (EDFA) made possible optical signal amplification in a wider band, which posed a significant impact on optical communications.

[Object]

An optical switch that turns an optical signal on and off is a technical element of various types of optical signal processing that will be needed in future photonic networks.

[Techniques Developed]

The techniques we have developed relate to an ultra-high-speed optical switch that is capable of optical amplification, including highly non-linear optical fiber. The optical switch allows ultra-high-speed operation at 1 terabit per second or even faster by the non-linear optical effect of the optical fiber, while allowing amplification of optical signals by the optical parametric amplification effect.

[Advantage]

Using the optical switch we have developed, we implemented an ultra-high-resolution waveform monitor having a temporal resolution far exceeding that of a conventional waveform monitor based on electronic circuitry, and succeeded in precisely observing waveforms of ultra-high-speed signals up to 640 Gbps. We also succeeded in reading 640-Gbps ultra-high-speed signals as 10-Gbps signals in 64 channels.

Fig. 9

Ultra-High-Speed O
Capable of Optical
--Ultra-high-speed optical si
gigabits per second demons

[Background of Development]
  Signal processing that is based
signal processing) has the possibility of achiev
high-capacity by a factor of 100 to 1,000 or eve
electronic signal processing.
  In the past, the development of
made possible optical signal amplification in a
impact on optical communications.

[Object]
  An optical switch that turns an o

Fig. 10

Ultra-High-Speed Optical S\
Capable of Optical Amplifica
--Ultra-high-speed optical signal pr
gigabits per second demonstrated-

[Background of Development]

Signal processing that is based on physical prop signal processing) has th[ 1 ]ibility of achieving processing high-capacity by a factor [ 1 ] to 1,000 or even higher comp electronic signal processing.

In the past, the development of erbium doped fib made possible optical sig [ 2 ] nplification in a wider band, whi impact on optical communications.

[Object]

An optical s[ 3 ] that turns an optical signal on element of various types [ 3 ] ical signal processing that will photonic networks.

[Techniques Developed]

The techniques we have developed relate to an switch that is capable of [ 4 ] amplification, including highly The optical switch allows [ 4 ] high-speed operation at 1 terab faster by the non-linear optical effect of the optical fiber, while

Fig. 11

Ultra-High-Speed Optical Switch Capable of Optical Amplification
--Ultra-high-speed optical signal processing at gigabits per second demonstrated--

[Background of development]

Signal processing that is based on physical properties of light (optical signal processing) has the possibility of enabling processing signals with high-speed and high-capacity by a factor of 100 to even higher compared with conventional electronic signal processing.

In the past, the development of erbium doped fiber amplifier (EDFA) made possible optical signal amplification in a wider band, which posed a significant impact on optical communications.

An optical switch that performs optical signal on and off is a technical element for various types of optical processing that will be needed in future photonic networks.

[Technique developed]

The techniques we have developed relate to an ultra-high-speed optical switch that is capable of optical amplification, including highly non-linear optical. The optical switch allows ultra-high-speed operation at 1 terabit per second or even faster by the non-linear optical effect of a highly non-linear optical fiber, while allowing amplification of optical signals by the optical parametric amplification effect.

[Advantage]

Using the optical switch we have developed, we implemented a high-resolution waveform monitor having a temporal resolution far exceeding that of a conventional waveform monitor based on an electronic circuitry, and succeeded in precisely observing waveforms of ultra-high-speed signals up to 640 Gbps. We succeeded in reading 640-Gbps ultra-high-speed signals as 10-Gbps signals in

Fig. 12

Ultra-High-Speed Optical Switch Capable of Optical Amplification

--Ultra-high-speed optical signal processing at 640 gigabits per second demonstrated--

[Background of Development]
    Signal processing that is based

Fig. 13

Ultra-High-Speed Optical Switch Capable of Optical Amplification
--Ultra-high-speed optical signal processing at 640 gigabits per second demonstrated--

[Background of Development]

Signal processing that is based on physical properties of light (optical sign 1 cessing) has the possibility of achieving processing with high-speed and high-capacity by a factor of 100 to 1,000 or even higher compared with conventional electronic signal processing.

In the past, the development of erbium doped fiber amplifier (EDFA) made p 2 e optical signal amplification in a wider band, which posed a significant impact on optical communications.

[Object]

An optical switch 3 urns an optical signal on and off is a technical element various types of optical

Fig. 14

Ultra-High-Speed Optical Switch Capable of Optical Amplification
--Ultra-high-speed optical signal processing at 640 gigabits per second demonstrated--

[Background of development]

Signal processing that is based on physical properties of light (optical signal processing) has the possibility of achieving processing with high-speed and high-capacity by a factor of 100 to 1,000 or even higher compared with conventional electronic signal processing.

In the past, the development of erbium doped fiber amplifier (EDFA) made possible optical signal amplification in a wider band, which had a significant impact on optical communications.

An optical switch that turns optical signal on and off is a technical element of various types of optical signal processing that will be needed in future photonic networks.

[Technique developed]

The techniques we have developed relate to an ultra-high-speed optical switch that is capable of optical amplification, including highly non-linear optical fiber. The optical switch allows ultra-high-speed operation at 1 terabit per second or even faster by non-linear optical effect of the optical fiber, while allowing amplification of optical signals by the optical parametric amplification effect.

[Advantage]

Using the optical switch we have developed, we implemented an ultra-high-resolution waveform monitor having a temporal resolution far exceeding that of a conventional waveform monitor based on electronic circuitry, and succeeded in precisely observing waveforms of ultra-high-

Fig. 15

Ultra-High-Speed Optical Switch Capable of Optical Amplification

--Ultra-high-speed optical signal processing at 640 gigabits per second demonstrated--

[Background of Development]

Signal processing that is based on physical properties of light (optical signal processing) has the possibility of achieving processing with high-speed and high-capacity by a factor of 100 to 1,000 or even higher compared with conventional electronic signal processing.

In the past, the development of erbium doped fiber amplifier (EDFA) made possible optical signal amplification in a wider band, which posed a significant impact on optical communications.

[Object]

An optical switch that turns an optical signal on and off is a technical element of various types of optical

Fig. 16

Ultra-High-Speed Optical Switch Capable of Optical Amplification

--Ultra-high-speed optical signal processing at 640 gigabits per second demonstrated--

[Background of Development]

Signal processing that is based on physical properties of light (optical signal processing) has the possibility of achieving processing with high-speed and high-capacity by a factor of 100 to 1,000 or even higher compared with conventional electronic signal processing.

In the past, the development of erbium doped fiber amplifier (EDFA) made possible optical signal amplification in a wider band, which posed a significant impact on optical communications.

[Object]

An optical switch that turns an optical signal on and off is a technical element of various types of optical

Fig. 19

Ultra-High-Speed Optical Switch Capable of Optical Amplification

--Ultra-high-speed optical signal processing at 640 gigabits per second demonstrated--

[Background of Development]

Signal processing that is based

Fig. 20

Ultra-High-Speed Optical Switch Capable of Optical Amplification

--Ultra-high-speed optical signal processing at 640 gigabits per second demonstrated--

[Background of Development]

| Signal | 1 | essing that is based |

Fig. 23

Ultra-High-Speed Optical Switch Capable of Optical Amplification

--Ultra-high-speed optical signal processing at 640 gigabits per second demonstrated--

[Background 1 Development]

Signal processing that is based on physical properties of light (optical signal processing) has the possibility of achieving processing with high-speed and high-capacity by a factor of 100 to 1,000 or even higher compared with conventional electronic signal processing.

In the past, the development of erbium doped fiber amplifier (EDFA) made possible optical signal amplification in a wider band, which posed a significant impact on optical communications.

[Content]

An optical switch that turns an optical signal on and off is a technical element various types of optical

Fig. 28

Ultra-High-Speed O
[1]
Capable of Optical A

--Ultra-high-speed optical si
[2]
gigabits per second demons

[Background of Development]

Signal processing that is based c
signal processing) ha[3]e possibility of achievi
high-capacity by a factor of 100 to 1,000 or eve
electronic signal processing.

In the past, the development of e
made possible optica[4]nal amplification in a v
impact on optical communications.

[Object]

An opti[5]witch that turns an op

Fig. 31

| text block 1 | start address 1 | end address 1 | speech data 1 | text block 2 | start address 2 | end address 2 | speech data 2 | ... |

Fig. 34

| score block 1 | top-left coordinates 1 | bottom-right coordinates 1 | Performance data 1 | score block 2 | top-left coordinates 2 | bottom-right coordinates 2 | Performance data 2 | ... |

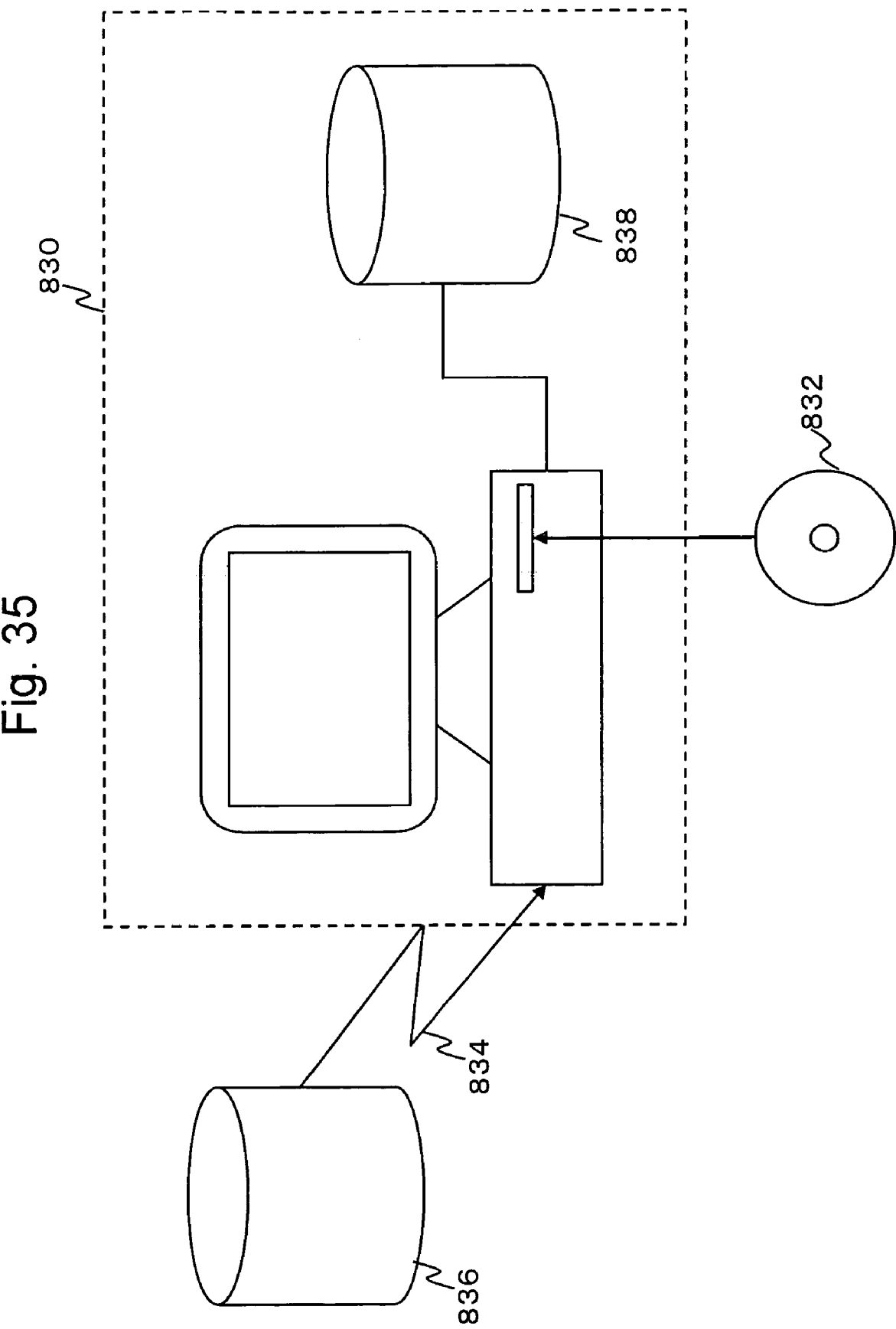

APPARATUS FOR PRESENTING INFORMATION AND METHOD THEREOF

BACKGROUND OF THE INVENTION

1. Field of the Invention

The present invention relates to information presenting apparatuses, particularly to an information presenting apparatus that displays a screen and outputs a sound in combination.

2. Description of the Related Art

Recently, small portable terminals having displays, such as PDAs or cellular phones, are becoming common. These terminals are so small that only limited amounts of information can be displayed on screens. When an attempt is made to display an amount of information exceeding the limits, characters could be too small to be legible.

When layout of information contributes to legibility, as in the case of newspapers or catalogs, it is important to display the information while maintaining the layout. However, when an attempt is made to display a range of article of a size that is only recognizable in terms of layout structure in a small screen, the sizes of characters displayed become too small so that only headers or the like are legible.

It is possible to change the display scaling factor as needed so that characters in a part of interest are sized suitably for reading. However, since the overall layout structure cannot be recognized in an enlarged state, operations for changing the scaling factor or the display position tend to occur frequently, which is laborious for users.

Furthermore, when the document is not originally intended for display on a small screen, if wrapping is not carried out in the screen, lines of text are each displayed only partially. Thus, it is not allowed to view the entire series of text and the text becomes only a collection of small segments. This degrades the ease of understanding.

Similar problems could occur for musical scores as well as texts.

An approach that can be taken when it is not possible to read the content under the current display state is to listen to the content by speech instead of reading information on the display screen.

According to techniques disclosed in Japanese Unexamined Patent Application Publication No. 2001-209645, in displaying a document accumulated in a filing system, when coordinates on an original image displayed is specified, text in a text area associated with the coordinates specified is read aloud. This is presumed to be used when it is not allowed to recognize some text due to the resolution of a display apparatus, and an arbitrary text area can be specified.

Problems of the information presenting apparatus according to the related art will be described with reference to FIGS. 1 and 2.

FIG. 1 is a schematic block diagram showing the construction of the information presenting apparatus according to the related art. FIG. 2 is a flowchart of an operation executed by the information presenting apparatus according to the related art.

A document inputting unit 2 extracts document information 54 from a document 52 including text (S2), and a layout analyzer 4 extracts data 56 including text blocks and position information of the respective text blocks in the document information (S4). Then, a display data extractor 6 extracts display data 58 for one screen (S6), and a document display unit 10 displays corresponding information (S10).

When read-aloud-target text is specified by a read-aloud-target specification acceptor 20 (i.e., when step S20 results in YES), a conversion-target extractor 14 extracts read-aloud-target text data 68 (S22), and a speech outputting unit 16 converts the read-aloud-target text data 68 into speech and outputs the speech (S16).

When a change in the display position or a change in the display scaling factor is instructed by a display-position and display-scaling-factor changer 18 (i.e., when step S18 results in YES), the display data extractor 6 changes the display position or the display scaling factor according to the instruction (S6).

According to the related art, a user specifies text of interest using the read-aloud-target specification acceptor 20 from text in a document displayed on the screen to have the text read aloud.

A device that allows direct specification, such as a mouse, is provided as the read-aloud-target specification acceptor, in Japanese Unexamined Patent Application Publication No. 2001-209645.

SUMMARY OF THE INVENTION

According to the present invention, an information presenting apparatus estimates text blocks that are likely to be classified by a user as being poorly legible so that the user wishes the text blocks to be read aloud, and an arrangement that allows selection from those text blocks is provided. This improves the convenience for the user.

According to the basic principles of the present invention, it is assumed that the need for reading aloud text blocks that are contained in a screen and are displayed in a sufficiently legible size is small, and selection of only text blocks displayed in a poorly legible size or text blocks partially accommodated in the screen is allowed by simple operations, for example, pressing a numeric key corresponding to a block number, pressing keys defined for instructing movement to a next block and fixing selection of a block, or using speech commands or the like instead of pressing such keys. Text blocks that can be selected are displayed as distinguished from other areas, and block numbers are assigned as needed.

To this end, according to the present invention, an information presenting apparatus includes a document inputting unit that extracts document information from a document; a layout analyzer that extracts text blocks from the document information; a display data extractor that extracts display data for one screen; a poor-legibility-block extractor that extracts text blocks from the display data as display blocks, and that classifies display blocks in which sizes of characters as displayed are less than or equal to a predetermined size or in which text is partially accommodated as poor-legibility blocks; a document display unit that displays the display data so that areas of the respective poor-legibility blocks are distinguished from other areas; a block selector that accepts an instruction for selecting a read-aloud-target block from a user; a conversion-target extractor that extracts read-aloud-target text data corresponding to the block selected; and a speech outputting unit that converts the read-aloud-target text data into speech and outputs the speech.

According to the present invention, even under an environment where a device that allows direct instruction using a mouse, pen, the tip of a finger, or the like is not provided, or under an environment where a small display screen with which instruction using a pen or the tip of a finger is difficult is used, poorly legible text can be readily specified and the content thereof can be listened to as speech.

BRIEF DESCRIPTION OF THE DRAWINGS

FIG. 4 is a flowchart of an operation executed by the information presenting apparatus according to the first embodiment;

FIGS. 5A and 5B are diagrams showing first examples of data structures used in the information presenting apparatus according to the first embodiment;

FIGS. 6A and 6B are diagrams showing second examples of data structures used in the information presenting apparatus according to the first embodiment;

FIG. 7 is a diagram showing a third example of a data structure used in the information presenting apparatus according to the first embodiment;

FIG. 8 is a diagram showing an example of a document input to the information presenting apparatus according to the first embodiment;

FIG. 9 is a diagram showing a first example of a screen displayed by the information presenting apparatus according to the first embodiment;

FIG. 10 is a diagram showing a second example of a screen displayed by the information presenting apparatus according to the first embodiment;

FIG. 11 is a diagram showing a third example of a screen displayed by the information presenting apparatus according to the first embodiment;

FIG. 12 is a diagram showing a fourth example of a screen displayed by the information presenting apparatus according to the first embodiment;

FIG. 13 is a diagram showing a fifth example of a screen displayed by the information presenting apparatus according to the first embodiment;

FIG. 14 is a diagram showing a sixth example of a screen displayed by the information presenting apparatus according to the first embodiment;

FIG. 15 is a diagram showing a seventh example of a screen displayed by the information presenting apparatus according to the first embodiment;

FIG. 16 is a diagram showing an eighth example of a screen displayed by the information presenting apparatus according to the first embodiment;

FIG. 19 is a diagram showing a first example of a screen displayed by the information presenting apparatus according to the second embodiment;

FIG. 20 is a diagram showing a second example of a screen displayed by the information presenting apparatus according to the second embodiment;

FIG. 23 is a diagram showing an example of a screen displayed by the information presenting apparatus according to the third embodiment;

FIG. 28 is a diagram showing an example of a screen displayed by the information presenting apparatus according to the fifth embodiment;

FIG. 31 is a diagram showing an example of a data structure used in the information presenting apparatus according to the sixth embodiment;

FIG. 34 is a diagram showing an example of a data structure used in the information presenting apparatus according to the seventh embodiment; and FIG. 35 is a diagram showing an example of a computer environment.

DESCRIPTION OF THE PREFERRED EMBODIMENTS when a device that allows direct specification is not provided, a part to be read aloud is specified from among a large number of text areas, for example, by moving a cursor using a cross-shaped key or the like. This operation is laborious.

Furthermore, even if a device that allows direct specification is provided, when the device is based on operations by a pen or the tip of a finger, delicate specification of position is difficult when the screen is small.

For example, in the case of a small portable information device such as a portable phone or a PDA, a mouse is usually not provided. Furthermore, since the display screen is very small, specification of a part to be read aloud is difficult and laborious in the information presenting apparatus according to the related art.

Accordingly, it is an object of the present invention to provide an information presenting apparatus that allows poorly legible text to be readily specified and the content thereof to be listened to as speech, even under an environment where a device that allows direct instruction using a mouse, pen, the tip of a finger, or the like is not provided, or under an environment where a small display screen with which instruction using a pen or the tip of a finger is difficult is used.

Information presenting apparatuses according to embodiments described below are used particularly in portable devices having small display screens, such as cellular phones or small portable information devices.

First Embodiment

An information presenting apparatus according to a first embodiment of the present invention will be described with reference to FIGS. 3 to 16.

Figure 1:
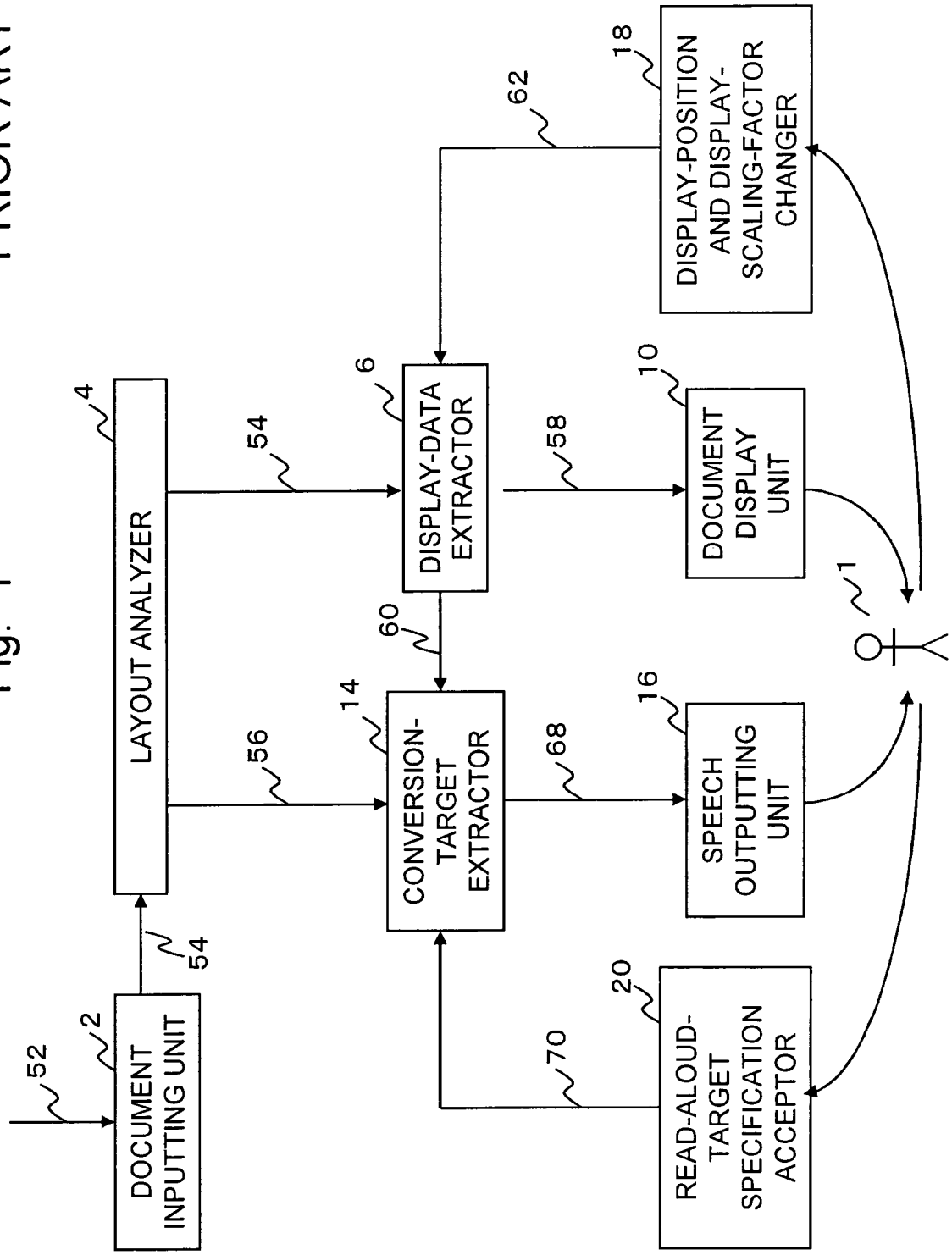
FIG. 1 is a schematic block diagram showing the construction of an information presenting apparatus according to the related art.
Figure 2:
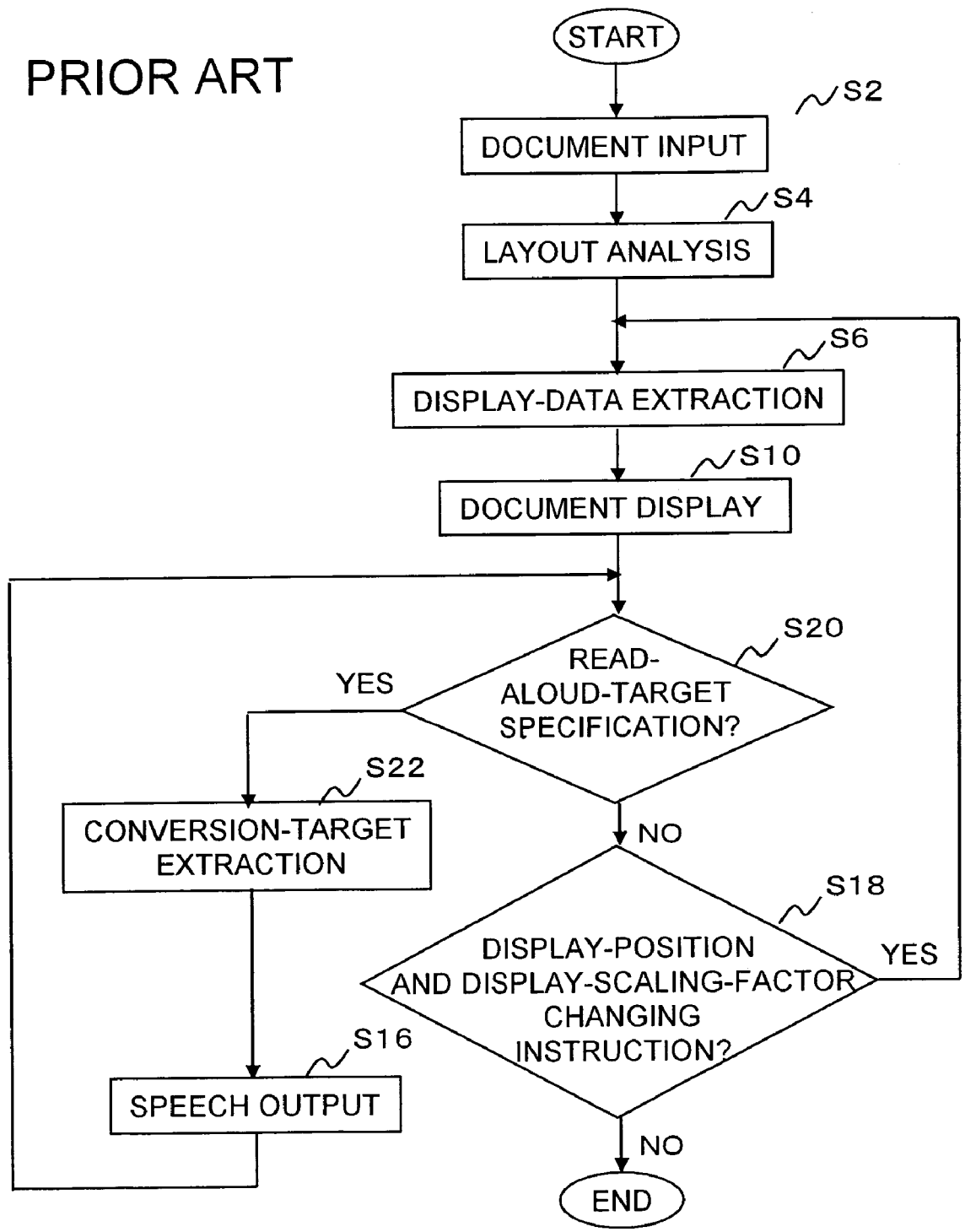
FIG. 2 is a flowchart of an operation executed by the information presenting apparatus according to the related art.
Figure 3:
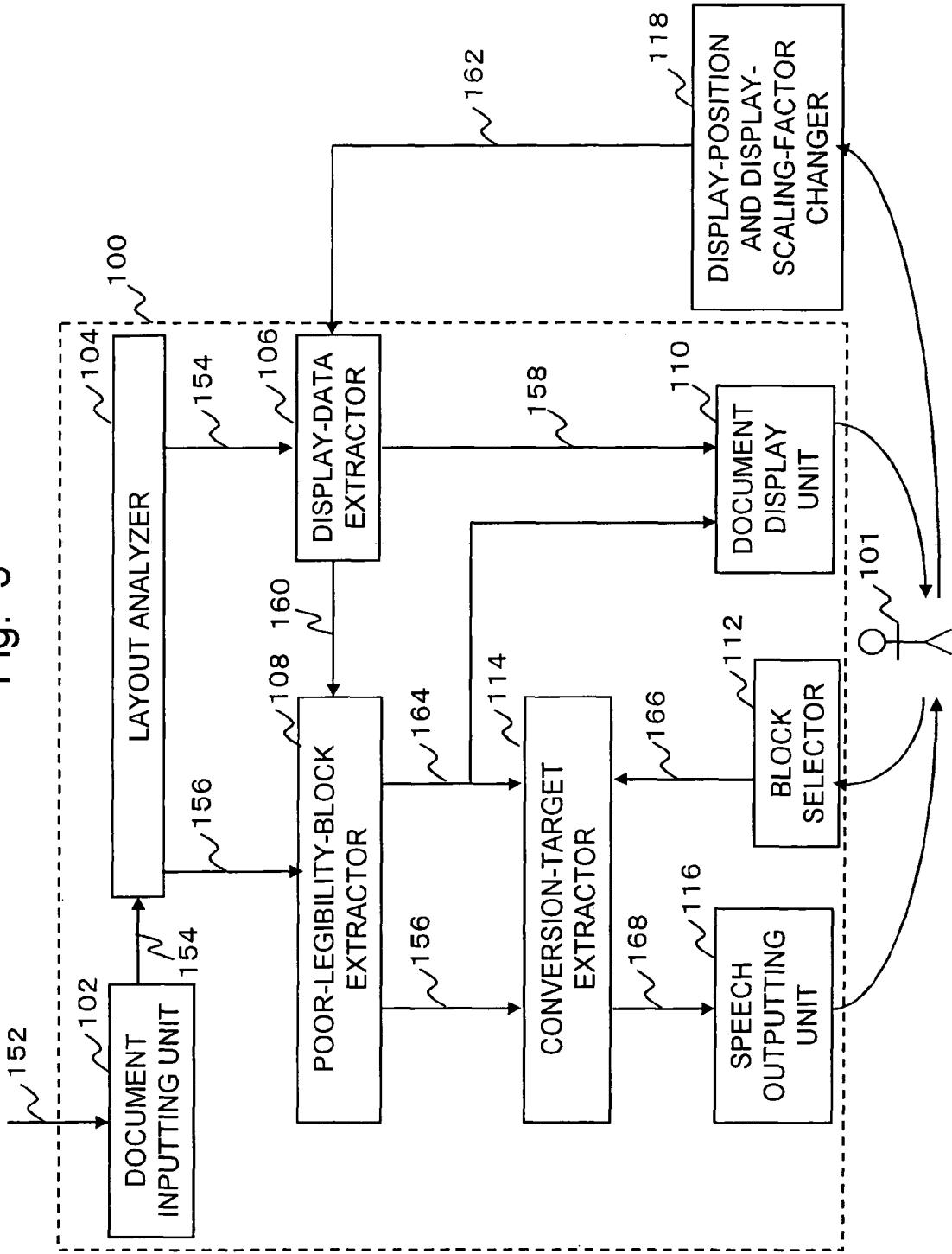
FIG. 3 is a schematic block diagram showing the construction of an information presenting apparatus according to a first embodiment of the present invention.

FIG. 3 is a schematic block diagram showing the construction of an information presenting apparatus 100 according to the first embodiment. FIG. 4 is a flowchart of an operation executed by the information presenting apparatus 100.

In the information presenting apparatus 100, text included in a document to be displayed on a screen is divided into some blocks, a block that is presumably poorly legible due to small sizes of characters is estimated from the blocks, and those presumably poorly legible blocks are displayed as distinguished from other blocks, with block numbers respectively assigned thereto. When a user presses a numeric key corresponding to the block number of a block of interest, the content of the corresponding text block is read aloud. A block number may not be just a number but may be a character string including alphabets, numeric characters or symbols.

A document inputting unit 102 extracts document information 154 from a document 152 including text, and outputs the document information 154 to a layout analyzer 104 (S102). The document inputting unit 102 may include, for example, a device for reading data stored on a recording medium, such as a CD or an MO, a device for receiving data transmitted via a wired or wireless network, or a device for reading information from pages of newspapers, magazines, or the like. The document information 154 may include, for example, information whose layout is fixed two-dimensionally, such as bitmap data, information coded as a one-dimensional symbol array, or structured data, such as data in the HTML format.

The layout analyzer 104 outputs the document information 154 inputted from the document inputting unit 102 to a display data extractor 106. Furthermore, the layout analyzer 104 extracts data 156 including text blocks and position information thereof in the document information from the document information 154, outputting the data 156 to a poor-legibility-block extractor 108 (S104). The data structure of the data 156 including the text blocks and the position information thereof in the document information is arbitrary. For example, as shown in FIG. 5A, the data structure may include sets of the content of each text block and a start address and an end address representing a position of the text block in the document information as represented in the form of a one-dimensional array. Alternatively, as shown in FIG. 5B, the data structure may include sets of the content of each text block and top-left coordinates and bottom-right coordinates of a position where the text block is to be placed in a two-dimensional layout of the document information.

The display data extractor 106, based on the document information 154 inputted from the layout analyzer 104, extracts display data 158 for one screen of a document display unit 110, and outputs the display data 158 to the document display unit 110. Furthermore, the display data extractor 106 outputs data 160 including the display data and position information thereof in the document information to the poor-legibility-block extractor 108 (S106). The data structure of the display data 158 is arbitrary. For example, as shown in FIG. 6A, the data structure may include sets of the content of each component to be displayed on the screen and top-left coordinates and bottom-right coordinates of a position where the component is to be placed on the screen. Also, the data structure of the data 160 including the display data and the position information thereof in the document information is arbitrary. For example, as shown in FIG. 6B, the data structure may include sets of the content of each component to be displayed on the screen, top-left coordinates and bottom-right coordinates of a position where the component is to be placed on the screen, and a start address and an end address representing a position of the component in the document information as represented in the form of a one-dimensional array.

As a display position and a display scaling factor of a document that is displayed first on the screen, predetermined default values are used (e.g., the display position is such that the top-left corner defined by the document information is matched with the top-left corner of the display screen, and the display scaling factor is ×1). Subsequently, the display position and the display scaling factor are changed based on data 162 including display-position changing information or display-scaling-factor changing information, which is inputted from a display-position and display-scaling-factor changer 118, and based on a current display position and a current display scaling factor.

The poor-legibility-block extractor 108 outputs the data 156 including the text blocks and the position information thereof in the document information, inputted from the layout analyzer 104, to a conversion target extractor 114. Furthermore, based on the data 156 and the data 160 including the display data and the position information thereof in the document information, which is inputted from the display data extractor 106, the poor-legibility-block extractor 108 extracts individual text blocks of text to be displayed on the screen as display blocks, calculates sizes of characters displayed on the screen in the individual display blocks, classifies display blocks including characters of sizes less than or equal to a predetermined size as poor-legibility blocks, and assigns block numbers to the respective poor-legibility blocks. Then, the poor-legibility-block extractor 108 outputs data 164 including the block numbers of the respective poor-legibility blocks, position information thereof in the document information, and position information thereof on the screen to the document display unit 110 and the conversion-target extractor 114 (S108). The data structure of the data 164 including the block numbers of the respective poor-legibility blocks, the position information thereof in the document information, and including the position information thereof on the screen is arbitrary. For example, as shown in FIG. 7, the data structure may include sets of the block number of each poor-legibility block, top-left coordinates and bottom-right coordinates of a position where the poor-legibility block is to be placed on the screen, and a start address and an end address representing a position of the poor-legibility block in the document information as represented in the form of a one-dimensional array.

The character sizes may be defined in any manner, for example, by font sizes of the characters, the vertical and horizontal pixel counts of rectangular areas occupied by the characters on the screen, or actual dimensions of the characters as displayed on the screen. However, when the pixel counts or actual dimensions are used, symbols or characters of relatively small sizes, such as punctuation marks, may be disregarded.

The document display unit 110 converts the display data 158 inputted from the display data extractor 106 into screen data for output to the display screen, and displays corresponding information on the display screen (S10). At this time, based on the data 164 including the block numbers of the respective poor-legibility blocks, the position information thereof in the document information, and the position information thereof on the screen, inputted from the poor-legibility-block extractor 108, the document display unit 110 creates screen data so that the areas of the respective poor-legibility blocks in the display data 158 are displayed as distinguished from other areas, with block numbers assigned to the areas of the respective poor-legibility blocks.

The method of displaying the areas of the respective poor-legibility blocks as distinguished from other areas is arbitrary. For example, the areas may be surrounded by lines defining the outlines thereof, the areas may be shown in a different color, the areas may be underlined, or the areas may be shaded.

A user 101 reads the document displayed on the document display unit 110, and instructs a change in the display position or enlargement or reduction of the displayed content as needed using the display-position and display-scaling-factor changer 118. Particularly, when the text is too small to read easily, the user instructs enlargement of the displayed content.

When the user 101 presses a numeric key corresponding to the block number of a block that the user wishes to be read aloud (i.e., when step S112 results in YES), a block selector 112 outputs a block number 166 represented by the numeric key to the conversion-target extractor 114.

Based on the block number 166 inputted from the block selector 112, the data 164 including the block numbers of the respective poor-legibility blocks, the position information thereof in the document information, and the position information thereof on the screen, and the data 156 including the text blocks and the position information. thereof in the document information, which is inputted from the poor-legibility-block extractor 108, the conversion-target extractor 114 extracts read-aloud-target text data 168 and outputs the read-aloud-target text data 168 to an speech outputting unit 116 (S114).

The speech outputting unit 116 converts the read-aloud-target text data 168 inputted from the conversion-target extractor 114 into speech using speech synthesis techniques based on a text-to-speech program and outputs the speech via a speaker or the like (S116).

When the user 101 instructs change in the display position or change in the display scaling factor using a cross-shaped key or the like (i.e., when S118 results in YES) the display-position and display-scaling-factor changer 118 outputs data 162 including display-position changing information or display-scaling-factor changing information to the display data extractor 106.

FIG. 8 is an example of a document input to the information presenting apparatus according to the first embodiment.

FIGS. 9 to 16 show examples of screens displayed by the information presenting apparatus according to the first embodiment.

When the input document shown in FIG. 8 is displayed as it is, the screen is too small to accommodate the document, so that the right part and lower part thereof are not displayed, as shown in FIG. 9.

In this state, the sizes of all the characters exceed the predetermined size, so that the characters are considered as legible and are displayed in a normal display mode.

When the displayed content shown in FIG. 9 is reduced as shown in FIG. 10, the sizes of the characters included in the text of the body become less than or equal to the predetermined size, so that frames representing candidates that can be selected for reading aloud are displayed for respective display blocks with block numbers assigned thereto. When the user presses a numeric key, text in the corresponding block is read aloud, including part that is not shown on the screen.

When the displayed content shown in FIG. 10 is further reduced as shown in FIG. 11, the sizes of characters in the header also become less than or equal to the predetermined size, so that similarly to the body, frames are displayed for respective display blocks with block numbers assigned thereto.

When the input document is structured data, such as data in the HTML format, and text is laid out in accordance with the width of a text display area, text that is out of the screen to the right side is wrapped at the right end, as shown in FIG. 12.

When the displayed content shown in FIG. 12 is reduced as shown in FIG. 13, the sizes of characters included in the text of the body become less than or equal to the predetermined size, so that frames are displayed for respective display blocks with block numbers assigned thereto.

When the displayed content shown in FIG. 13 is further reduced as shown in FIG. 14, the sizes of characters in the header also become less than or equal to the predetermined size, similarly to the body, so that frames are displayed for respective display blocks with block numbers assigned thereto.

According to the above description, block numbers assigned to respective poor-legibility blocks are displayed on the screen, and a block can be selected by pressing a numeric key corresponding to the block number of the block. Without limitation thereto, however, other schemes may be employed as long as a block displayed can be readily selected.

For example, one of the poor-legibility blocks may be displayed as a tentatively selected block, as distinguished from other poor-legibility blocks, and the tentatively selected block can be changed according to an input using a cross-shaped key, an arrow key, or a key predefined for instruction of a next candidate, and a block can be selected by an input using a key predefined for fixing selection. FIGS. 15 and 16 show examples of this scheme.

FIG. 15 is a diagram corresponding to FIG. 13. In FIG. 15, the first block is shaded instead of displaying a block number. When the user operates the cross-shaped key, the item shaded is changed, for example, as shown in FIG. 16. When the cross-shaped key is further operated, the shaded item is further changed. When the user presses a "*" key, the block currently shaded is read aloud. Although the cross-shaped key is used to change the tentatively selected block and the "*" key is used to fix selection in this example, without limitation to the example, keys that are used may be defined otherwise.

Alternatively, with display screens as shown in FIGS. 13 and 15, instead of key operations, a read-aloud-target block may be selected by speech commands based on speech recognition techniques. In that case, speeches such as "One" or "First" are used instead of pressing numeric keys, and speeches such as "Next", "Down", "This", "Fix", or "Read aloud" are used.

According to the first embodiment, text that is poorly legible in a document displayed can be readily selected, and the content thereof can be listened to as speech.

Second Embodiment

An information presenting apparatus according to a second embodiment of the present invention will be described with reference to FIGS. 17 to 20 and as needed with reference to figures with reference to which the first embodiment has been described. Parts or the like corresponding to those in the first embodiment will be designated by the same numerals, and descriptions thereof will be omitted.

Figure 17:
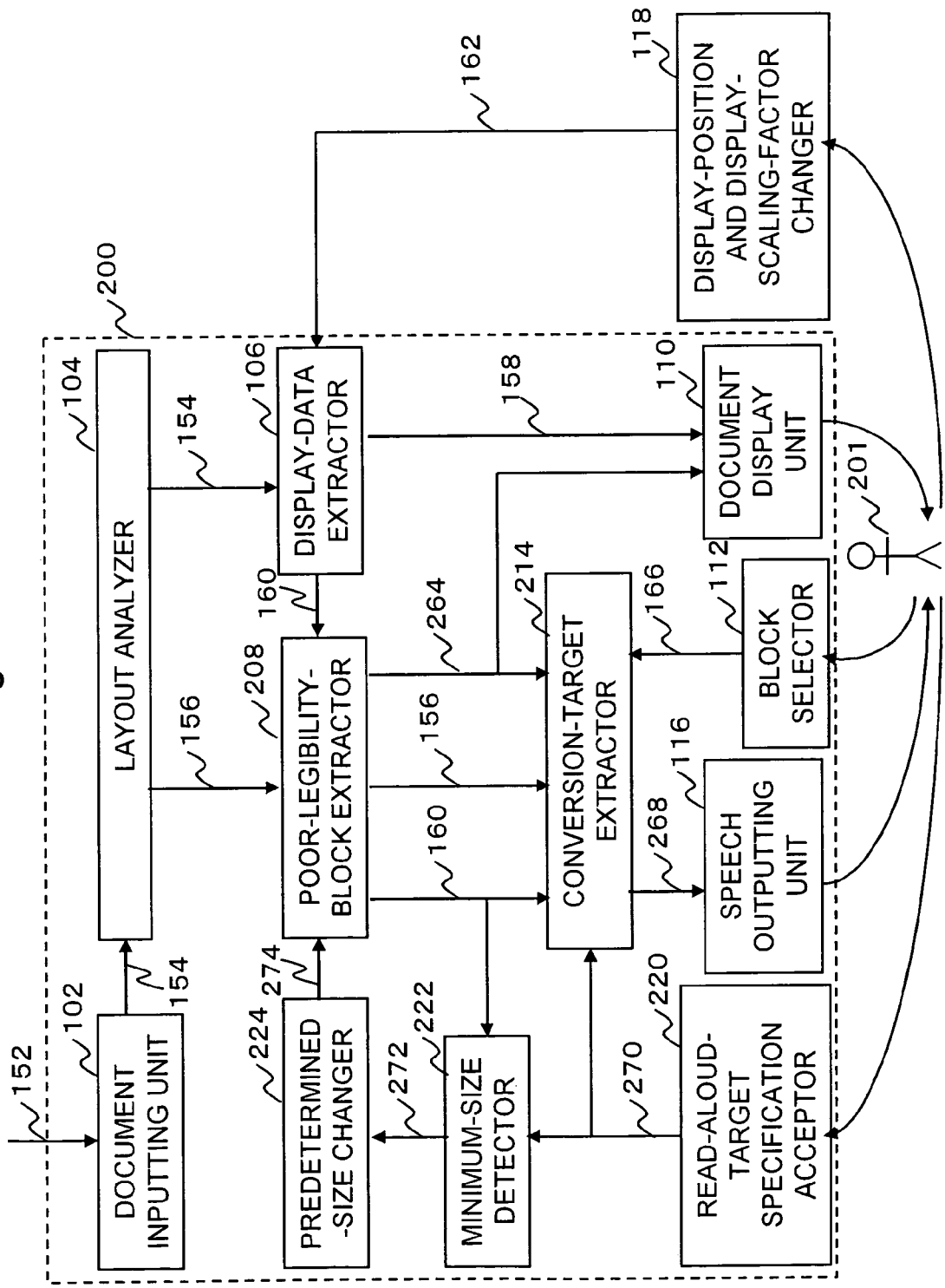
FIG. 17 is a schematic block diagram showing the construction of an information presenting apparatus according to a second embodiment of the present invention.
Figure 18:
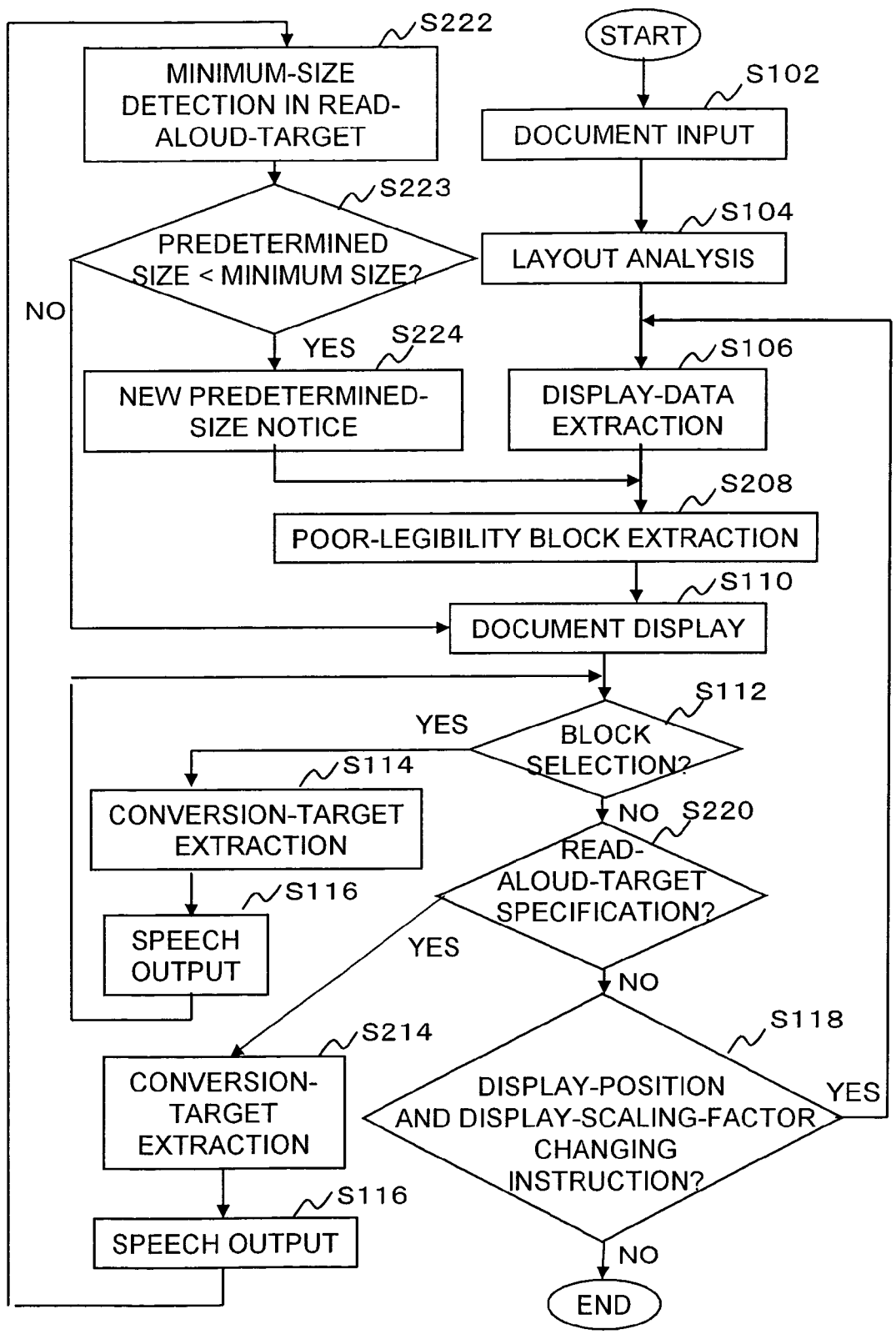
FIG. 18 is a flowchart of an operation executed by the information presenting apparatus according to the second embodiment.

FIG. 17 is a schematic block diagram showing the construction of an information presenting apparatus 200 according to the second embodiment. FIG. 18 is a flowchart of an operation executed by the information presenting apparatus 200.

The information presenting apparatus 200 includes a unit for specifying an arbitrary text on a screen and instructing the text to be read aloud, separately from a block selector 112. Thus, when the user instructs a text to be read aloud, which cannot be specified by the block selector 112, assuming that the text includes characters of sizes which are poorly legible for the user, in order that the text can be subsequently selected by the block selector 112, a predetermined size used to classify poor-legibility blocks is changed.

A read-aloud-target specification acceptor 220, when read-aloud-target text is specified by a user 201 using a tablet pen or the like (i.e. when S220 results in YES), outputs coordinate data 270 of the read-aloud-target text to a conversion-target extractor 214 and a minimum-size detector 222.

The conversion-target extractor 214 extracts a read-aloud-target text data 268 based on the coordinate data 270 of the read-aloud-target text, which is inputted from the read-aloud-target specification acceptor 220, the data 156 including the text blocks and the position information of the respective text blocks in the document information, which is inputted from a poor-legibility-block extractor 208, and data 160 including the display data and the position information of the display data, and outputs the read-aloud-target text data 268 to the speech outputting unit 116 (S214). The processing executed by the conversion-target extractor 214 is otherwise the same as the processing executed by the conversion-target extractor 114 in the first embodiment.

The minimum-size detector 222 checks character sizes based on the coordinate data 270 of the read-aloud-target text inputted from the read-aloud-target specification acceptor 220 and the data 160 including the display data and the position information of the display data in the document information, which is inputted from the poor-legibility-block extractor 208, and outputs a value 272 representing a minimum character size to a predetermined-size changer 224 (S222).

The predetermined-size changer 224 compares the value 272 representing the minimum character size, which is inputted from the minimum-size detector 222, with a current value of the predetermined size for classifying poor-legibility blocks. When the current value of the predetermined size is smaller (i.e., when step S223 results in YES), the predetermined size changer 224 outputs the value 272 representing the minimum character size as a new predetermined size 274 to the poor-legibility-block extractor 208 (S224).

The poor-legibility-block extractor 208 changes the predetermined size for classifying poor-legibility blocks to the new predetermined size 274 inputted from the predetermined-size changer 224. The poor-legibility-block extractor 208 then extracts poor-legibility blocks again, assigns block numbers to the poor-legibility blocks, and outputs data 264 including the block numbers of the respective blocks, position information of the respective blocks in the document information, and position information of the respective blocks on the screen to the document display unit 110 and the conversion-target extractor 214 (S208).

When the data 160 including the display data and the position information in the document information is inputted from the display data extractor 106, the poor-legibility-block extractor 208 outputs this information to the conversion-target extractor 214 and the minimum-size detector 222. The processing executed by the poor-legibility-block extractor 208 is otherwise the same as the processing executed by the poor-legibility-block extractor 108 in the first embodiment.

FIGS. 19 and 20 show examples of screens displayed by the information presenting apparatus according to the second embodiment.

Also in the description of the second embodiment, the document shown in FIG. 8 is used as an example of input document. When the input document is structured data, such as data in the HTML format, and is displayed with wrapping, the document is displayed as shown in FIG. 12.

When the user issues a read-aloud instruction in the display state shown in FIG. 12, a segment relevant to the instruction is shaded as shown in FIG. 19.

The text corresponding to this segment is read aloud. At this time, since the value representing the minimum character size in this text exceeds the current value of the predetermined size for classifying poor-legibility blocks, the predetermined size is changed to the value representing the minimum character size, so that the screen changes to that shown in FIG. 20. That is, the text displayed on the screen is the same as that shown in FIG. 12, but frames indicating candidates that can be selected for reading aloud, absent in FIG. 12, are displayed in the area of the body, with block numbers assigned thereto.

According to the second embodiment, the criteria for determining the illegibility of text can be automatically adjusted according to the status of operation by the user.

Third Embodiment

An information presenting apparatus according to a third embodiment of the present invention will be described with reference to FIGS. 21 to 23 and also as needed with reference to figures with reference to which the first and the second embodiments have been described. Parts or the like described in relation to the first embodiment are designated by the same numerals, and descriptions thereof will be omitted.

Figure 21:
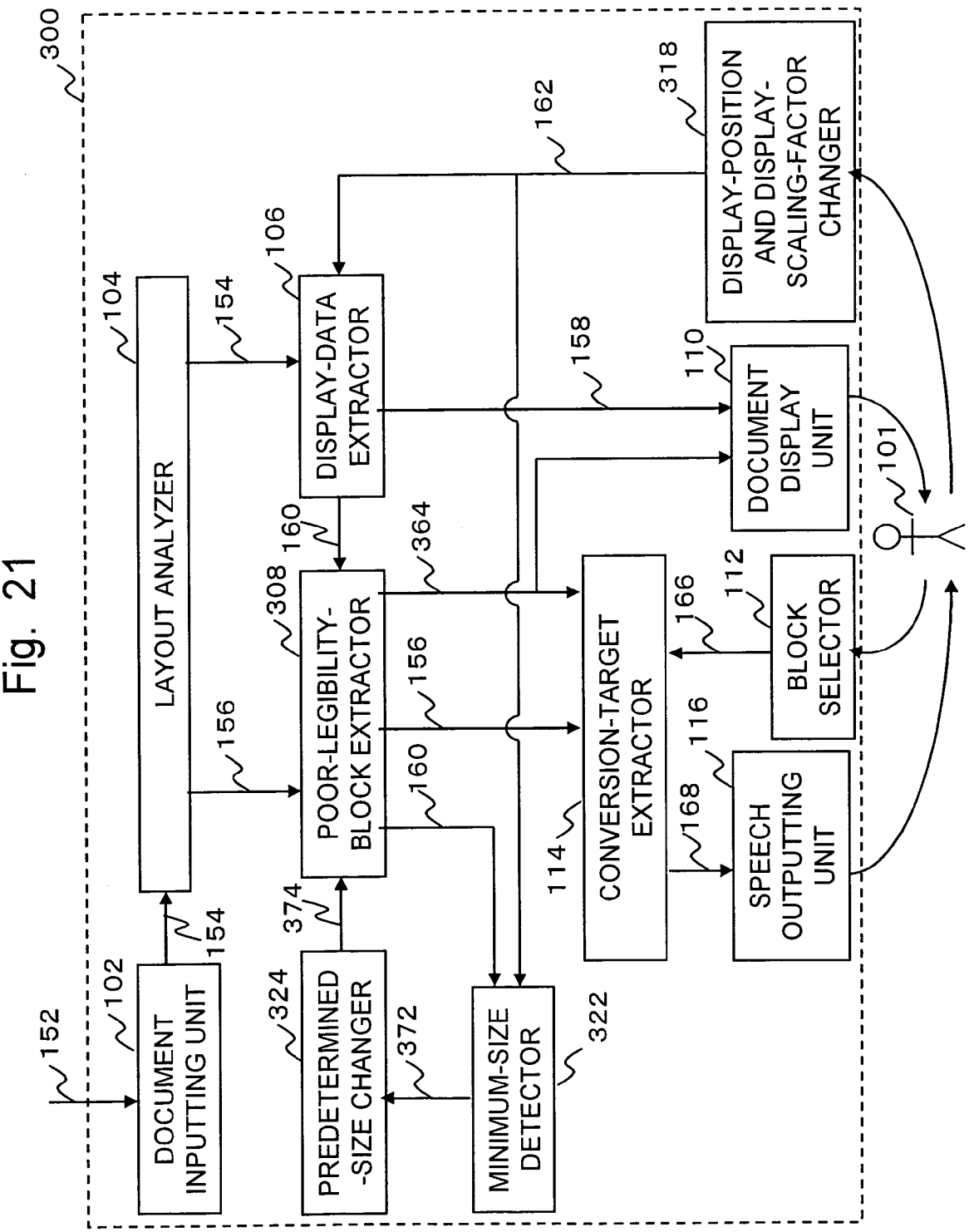
FIG. 21 is a schematic block diagram showing the construction of an information presenting apparatus according to a third embodiment of the present invention.
Figure 22:
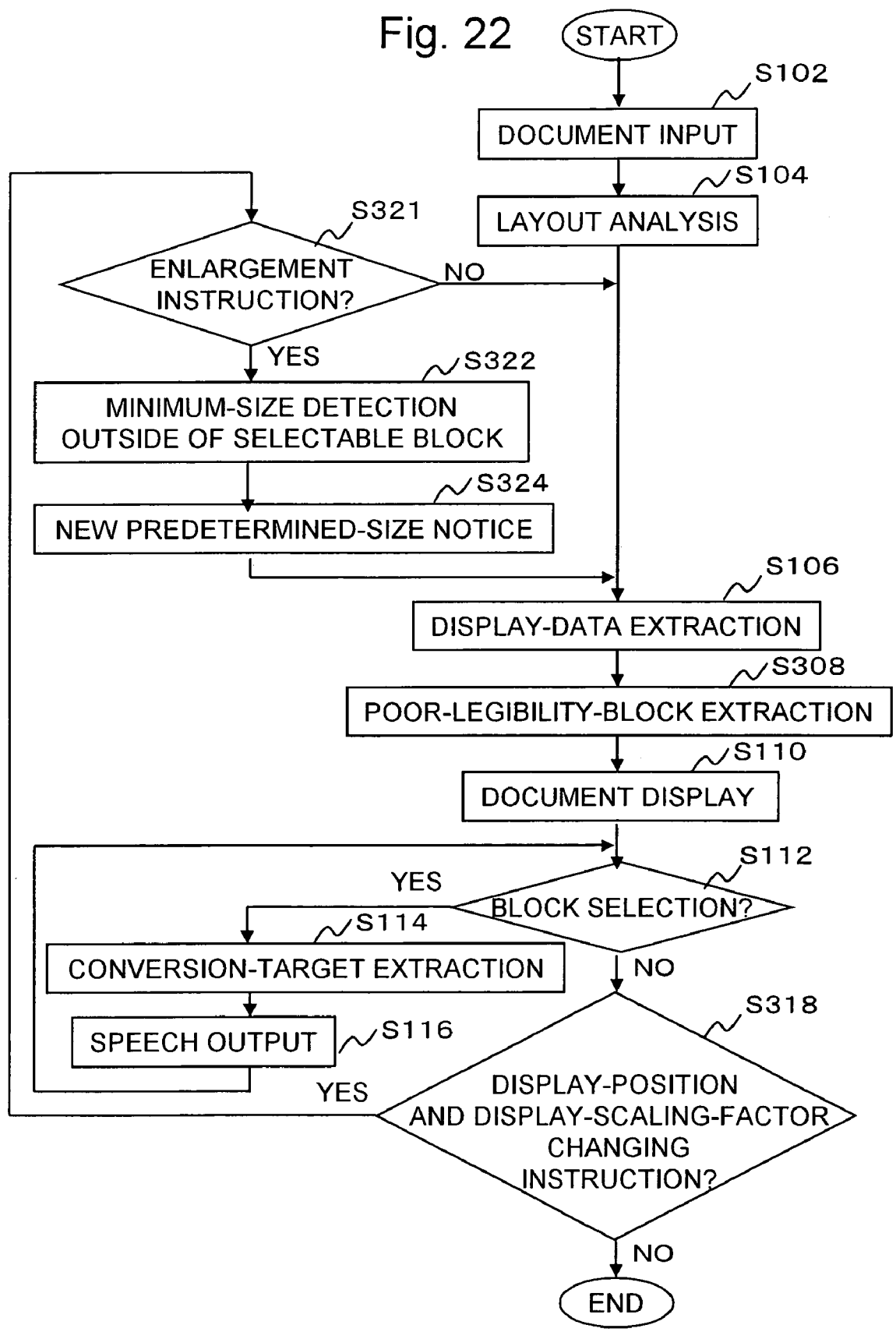
FIG. 22 is a flowchart of an operation executed by the information presenting apparatus according to the third embodiment.

FIG. 21 is a schematic block diagram showing the construction of an information presenting apparatus 300 according to the third embodiment. FIG. 22 is a flowchart of an operation executed by the information presenting apparatus 300.

In the information presenting apparatus 300, when the user instructs enlargement of the content displayed on the screen, assuming that characters of sizes poorly legible for the user also exists in text that cannot be selected by a block selector 112, in order that text of these sizes can be subsequently selected by the block selector 112, the predetermined size used for classifying poor-legibility blocks can be changed.

When the user 101 instructs change in the display position or change in the display scaling factor using a cross-shaped key or the like (i.e., when step S318 results in YES), a display-position and display-scaling-factor changer 318 outputs data 162 including display-position changing information or display-scaling-factor changing information to the display data extractor 106 and a minimum-size detector 322.

The minimum-size detector 322, when the data 162 including display-position changing information or display-scaling-factor changing information instructs enlargement of the document (i.e., when step S321 results in YES), based on the data 160 including the display data and the position thereof in the document information, which is inputted from the poor-legibility-block extractor 208 before enlargement, extracts a text that is not included in poor-legibility blocks in the document displayed on the screen before enlargement, and outputs a value 372 representing a minimum character size in the text to a predetermined-size changer 324 (S322).

The predetermined-size changer 324 outputs the value 372 representing the minimum character size, which is detected in the minimum-size detector 322, to the poor-legibility-block extractor 308 as a new predetermined size 374 (S324).

The poor-legibility-block extractor 308 changes the predetermined size for classifying poor-legibility blocks to the new predetermined size 374 inputted from the predetermined-size changer 324, and then extracts poor-legibility blocks again. The poor-legibility-block extractor 308 assigns block numbers to the poor-legibility blocks, and outputs data 364 including the block numbers of the respective poor-legibility blocks, position information thereof in the document information, and including position information thereof on the screen to the document display unit 110 and the conversion-target extractor 114 (S308).

The poor-legibility-block extractor 308, when the data 160 including the display data and the position information thereof in the document information is inputted from the display data extractor 106, outputs the data 160 to the minimum size detector 322. The processing executed by the poor-legibility-block extractor 308 is otherwise the same as that executed by the poor-legibility-block extractor 108 in the first embodiment.

FIG. 23 is an example of a screen displayed by the information presenting apparatus 300.

Also in the description of the third embodiment, the document shown in FIG. 8 is used as an example of input document. When the input document is structured data, such as data in the HTML format, and is displayed with wrapping, the document is displayed as shown in FIG. 12. When the document displayed is reduced, the document is displayed as shown in FIG. 13.

When the user instructs enlargement of the displayed content under the display status shown in FIG. 13, the display status is supposed to return to that shown in FIG. 12. At this time, a value representing a minimum character size in text not surrounded by frames on the display screen shown in FIG. 13 is extracted, and the predetermined size for classifying poor-legibility blocks is changed to the value representing the minimum character size. Thus, the display status is changed to that shown in FIG. 20 instead of that shown in FIG. 12. That is, although the text displayed on the screen is the same as that shown in FIG. 12, frames indicating candidates that can be selected for reading aloud, which are absent in FIG. 12, are displayed in the area of the body, and block numbers are assigned thereto.

When the user instructs shrinkage of the content displayed, the screen changes to that shown in FIG. 23. That is, although the text displayed on the screen is the same as that shown in FIG. 13, frames indicating candidates that can be selected for reading aloud, which are absent in FIG. 13, are displayed in the header area as well as in the body area, and block numbers are assigned thereto.

According to the third embodiment, the criteria for determining the illegibility of text can be automatically adjusted according to the status of operation by the user.

Fourth Embodiment

An information presenting apparatus according to a fourth embodiment of the present invention will be described. Parts or the like described in relation to the first embodiment will be designated by the same numerals, and descriptions thereof will be omitted.

Figure 24:
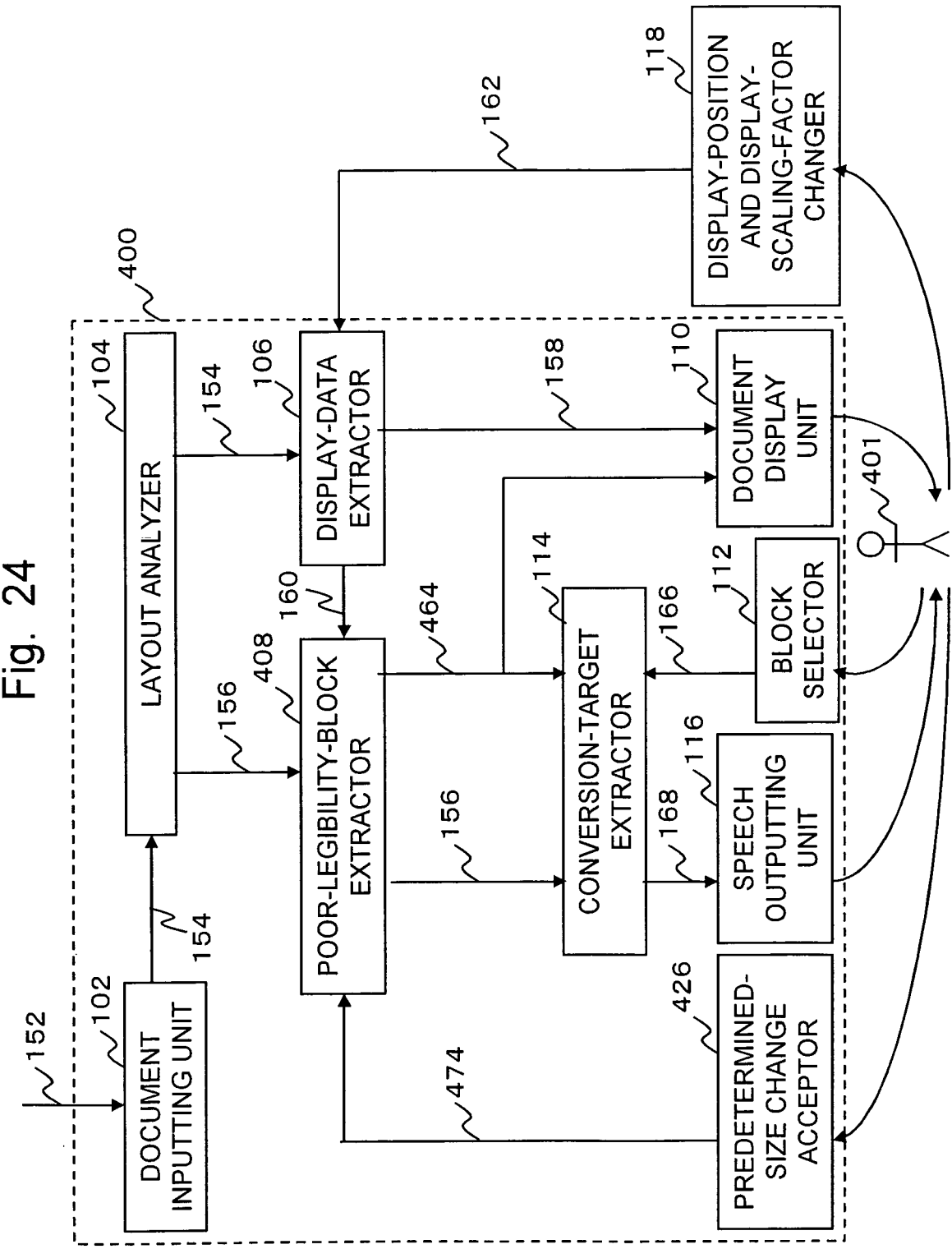
FIG. 24 is a schematic block diagram showing the construction of an information presenting apparatus according to a fourth embodiment of the present invention.
Figure 25:
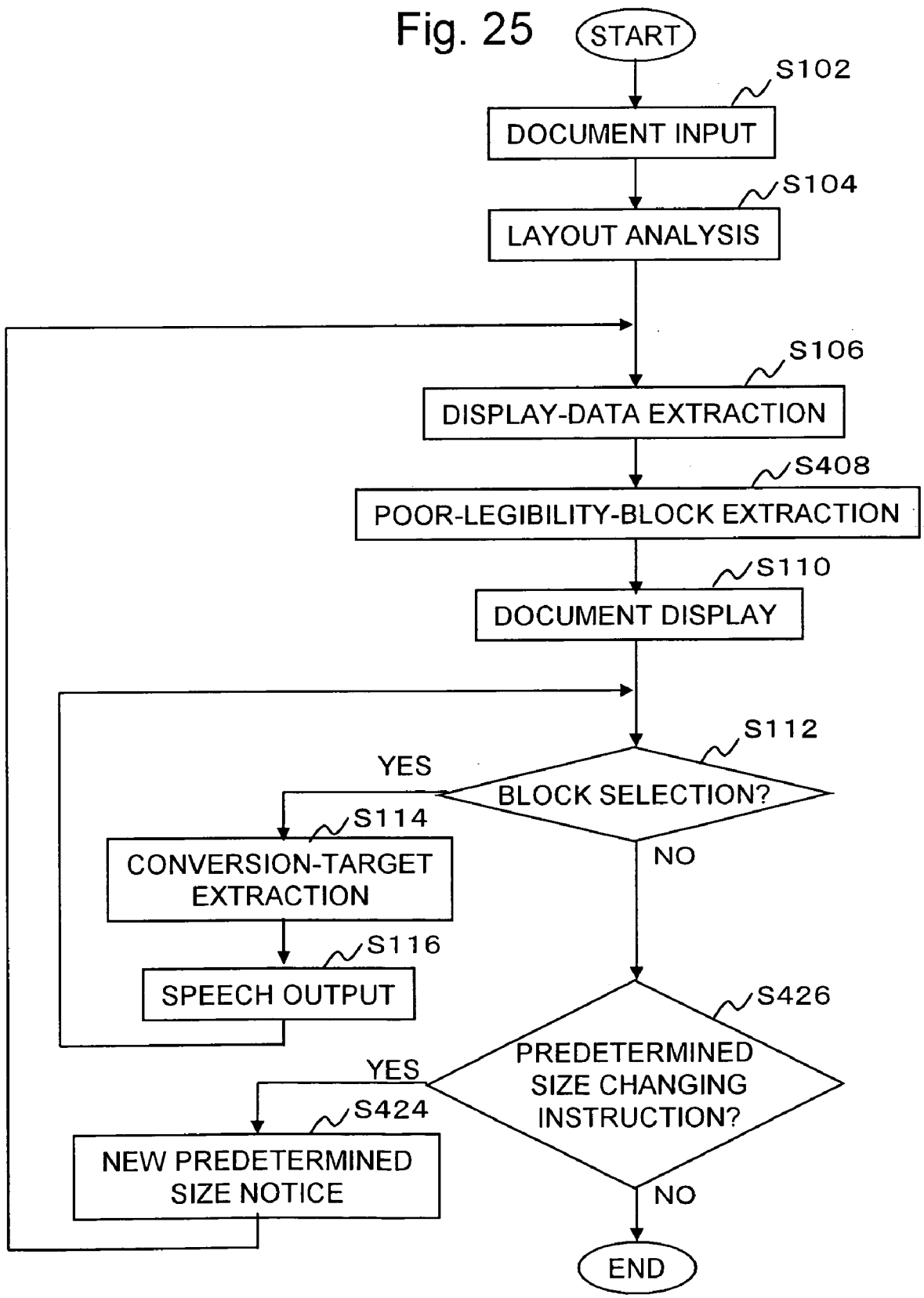
FIG. 25 is a flowchart of an operation executed by the information presenting apparatus according to the fourth embodiment.

FIG. 24 is a schematic block diagram showing the construction of an information presenting apparatus 400 according to the fourth embodiment. FIG. 25 is a flowchart of an operation executed by the information presenting apparatus 400.

In the information presenting apparatus 400, the predetermined size used for classifying poor-legibility blocks can be changed according to instructions by a user.

When the user 401 instructs a change in the predetermined size used for classifying poor-legibility blocks using a cross-shaped key or the like (i.e., when step S426 results in YES), a predetermined-size change acceptor 426 outputs a new predetermined size 474 to a poor-legibility-block extractor 408 (S424).

The poor-legibility-block extractor 408 changes the predetermined size for classifying poor-legibility blocks to the new predetermined size 474 inputted from the predetermined-size change acceptor 426 and then extracts poor-legibility blocks again. The poor-legibility-block extractor 408 assigns block numbers to the poor-legibility blocks, and outputs data 464 including block numbers of the respective poor-legibility blocks, position information thereof in the document information, and position information thereof on the screen to the document display unit 110 and the conversion-target extractor 114 (S408). The processing executed by the poor-legibility-block extractor 408 is otherwise the same as the processing executed by the poor-legibility-block extractor 108 in the first embodiment.

According to the fourth embodiment, when the criterion for classifying the illegibility of text is not appropriate for the user, the criterion for classifying the illegibility can be adjusted according to instructions by the user. Furthermore, in combination with the second embodiment or the third embodiment, when the predetermined size automatically adjusted according to the second embodiment or the third embodiment is not appropriate for the user, the criterion for classifying the illegibility can be adjusted according to instructions by the user.

Fifth Embodiment

An information presenting apparatus according to a fifth embodiment of the present invention will be described with reference to FIGS. 26 to 28 and as needed with reference to figures with reference to which the first embodiment has been described. Parts or the like corresponding to those described in relation to the first embodiment are designated by the same numerals, and descriptions thereof will be omitted.

Figure 26:
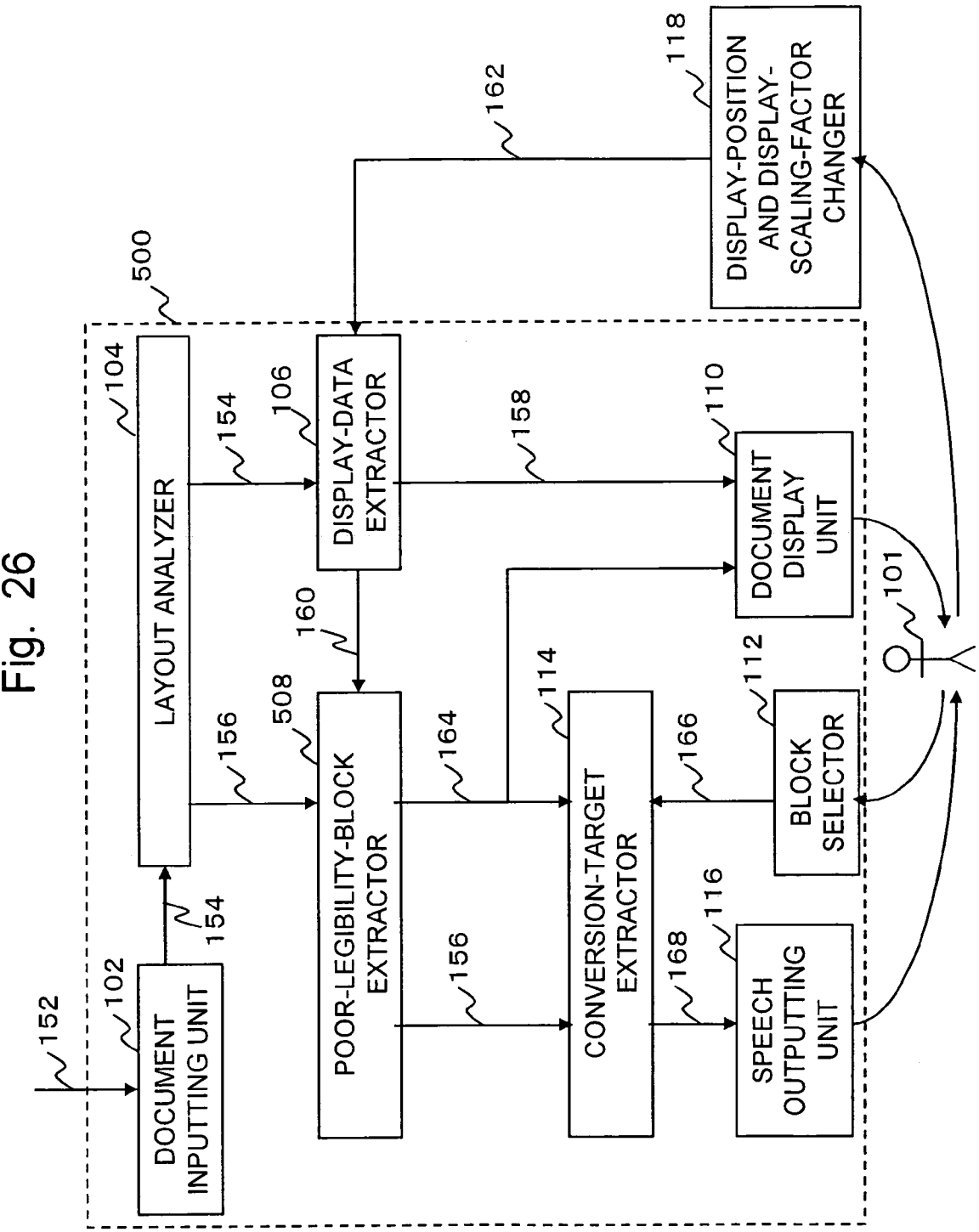
FIG. 26 is a schematic block diagram showing the construction of an information presenting apparatus according to a fifth embodiment of the present invention.
Figure 27:
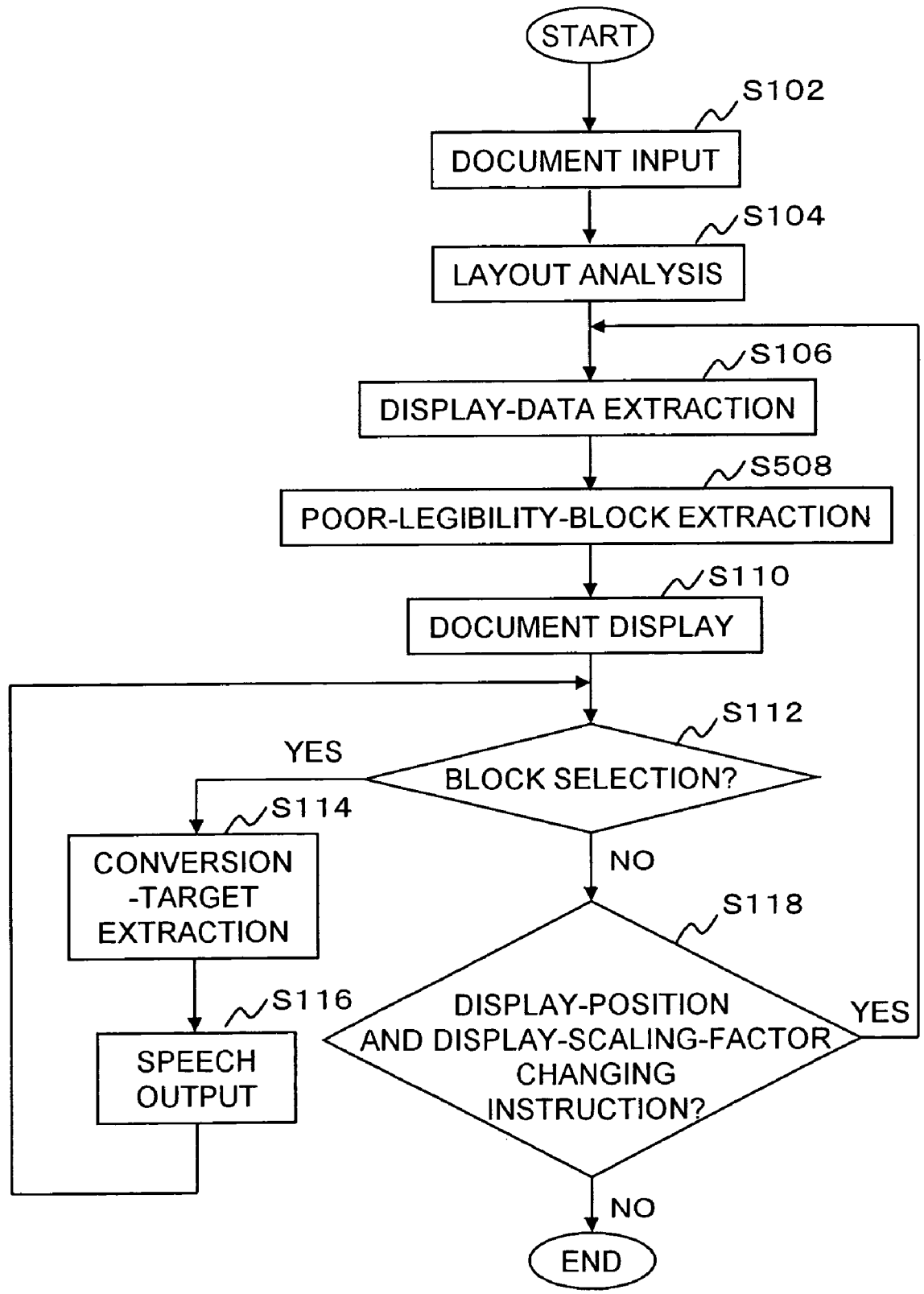
FIG. 27 is a flowchart of an operation executed by the information presenting apparatus according to the fifth embodiment.

FIG. 26 is a schematic block diagram showing the construction of an information presenting apparatus 500 according to the fifth embodiment. FIG. 27 is a flowchart of an operation executed by the information presenting apparatus 500.

In the information presenting apparatus 500, a text that is partially accommodated on the screen can also be classified as being poorly legible and can be selected by a block selector 112.

Based on the data 156 including the text blocks and the position information thereof in the document information, which is inputted from the layout analyzer 104, and based on the data 160 including the display data and the position information thereof in the document information, which is inputted from the display data extractor 106, a poor-legibility-block extractor 508 extracts individual text block to be displayed on the screen as display blocks, and classifies display blocks in which the text blocks in the data 156 are displayed only partially as poor-legibility blocks (S508). When an ineffective area is set in a peripheral area of the screen so that a display block is included only an ineffective area, the display block may be excluded from the poor-legibility blocks. That is, when only a very small part of a text block is displayed, the relevant display block may be excluded from candidates that can be selected by the block selector 112. This serves to restrict the number of blocks as candidates for selection, and to thereby improve the ease of operation. The processing executed by the poor-legibility-block extractor 508 is otherwise the same as the processing executed by the poor-legibility-block extractor 108 in the first embodiment.

FIG. 28 shows an example of screen displayed by the information presenting apparatus 500.

Also in the description of the fifth embodiment, the document shown in FIG. 8 is used as an example of input document. When the document is displayed as it is, the document is displayed as shown in FIG. 28. That is, although no display block in which character sizes are less than or equal to a predetermined size exists, display blocks in which text is partially accommodated on the right side exist. Thus, frames indicating candidates that can be selected for reading aloud are displayed with block numbers assigned thereto. When the user presses a key corresponding to a block number, text in the corresponding block, including part not displayed on the screen, is read aloud.

According to the fifth embodiment, even when the content of text is poorly legible since the text is not fully accommodated in the screen although character sizes are sufficiently large, the text can be readily selected and can be read aloud for listening.

Sixth Embodiment

An information presenting apparatus according to a sixth embodiment of the present invention will be described with reference to FIGS. 29 to 31. Parts or the like corresponding to those described in relation to the first embodiment are designated by the same numerals, and descriptions thereof will be omitted.

Figure 29:
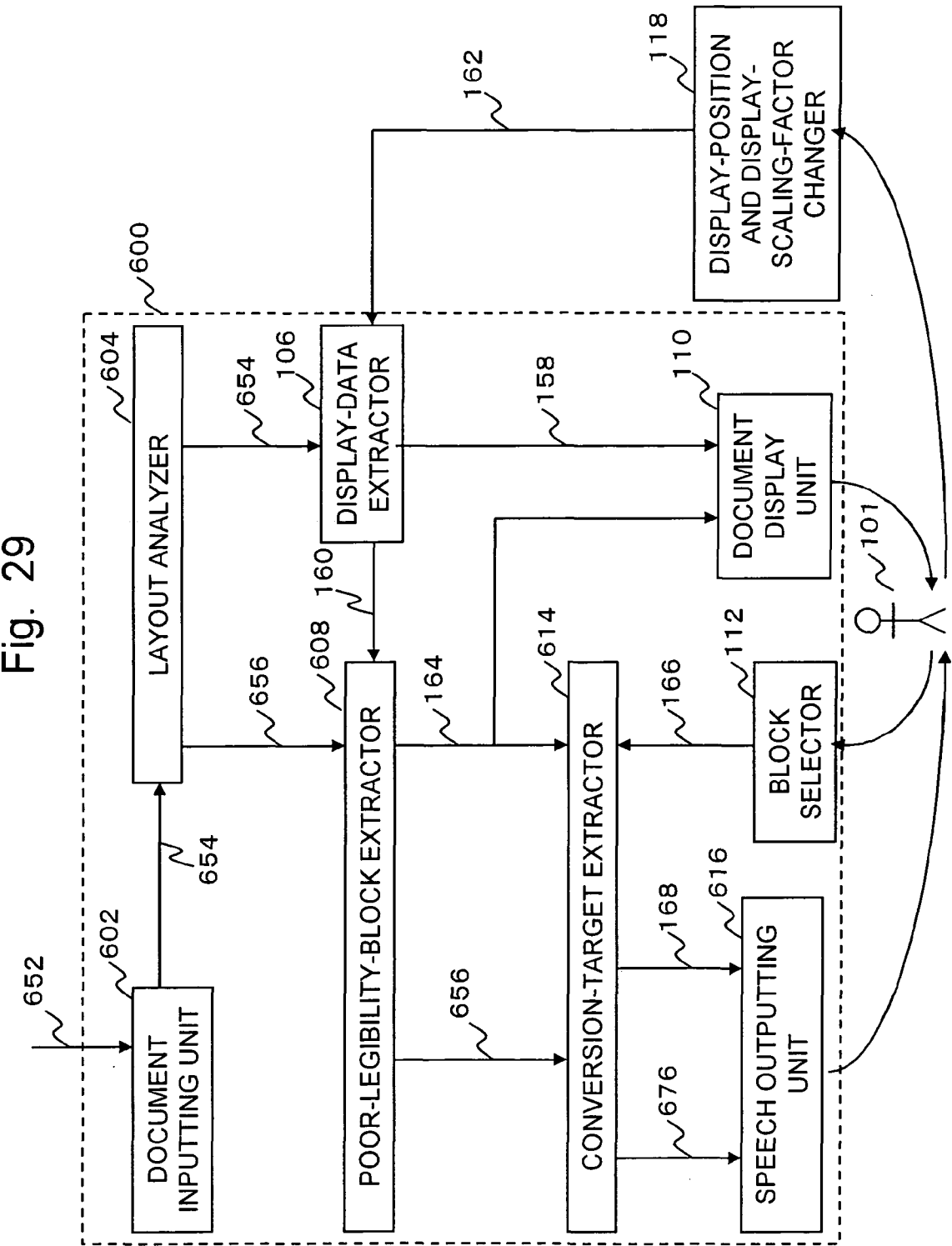
FIG. 29 is a schematic block diagram showing the construction of an information presenting apparatus according to a sixth embodiment of the present invention.
Figure 30:
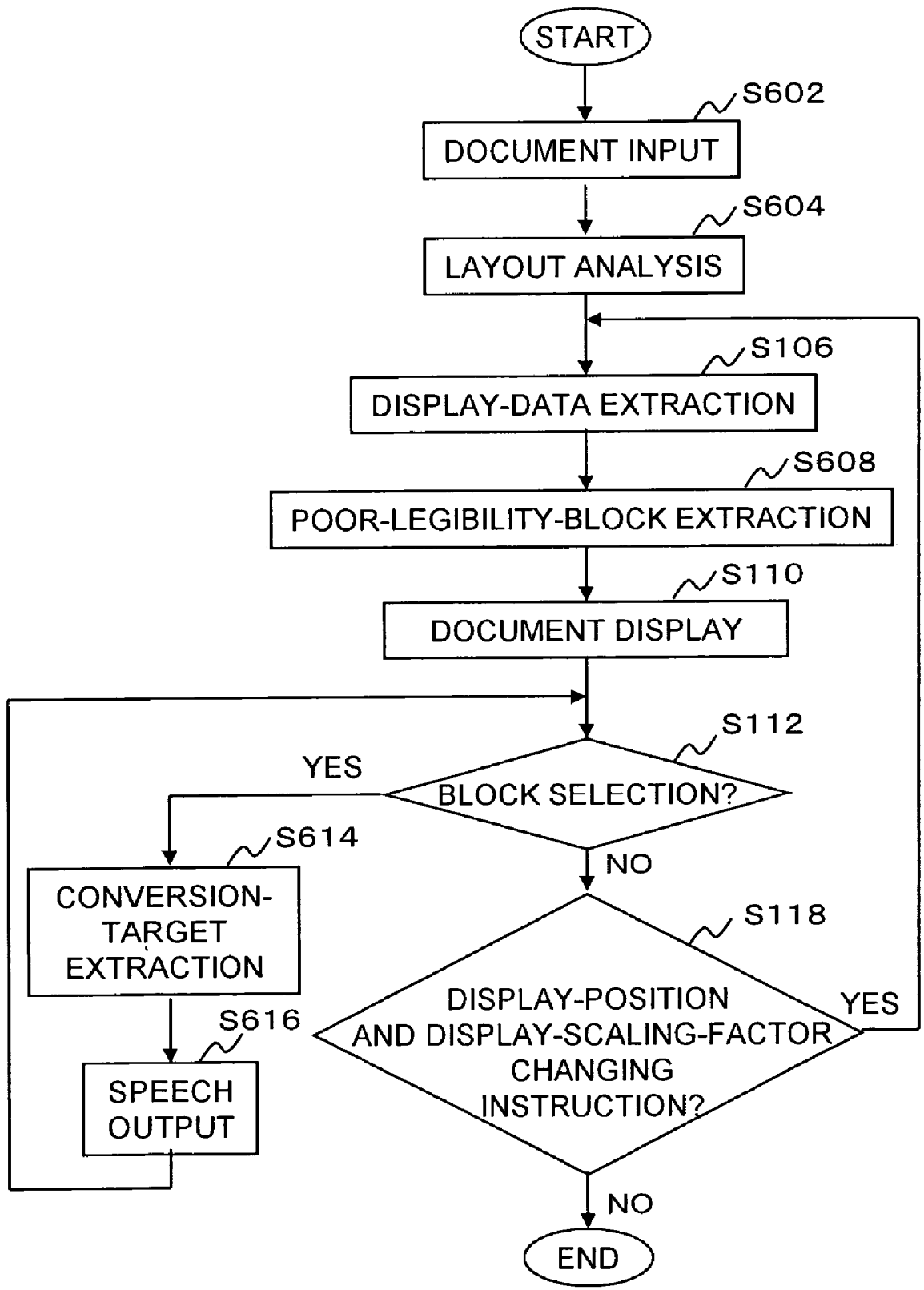
FIG. 30 is a flowchart of an operation executed by the information presenting apparatus according to the sixth embodiment.

FIG. 29 is a schematic block diagram showing the construction of an information presenting apparatus 600 according to the sixth embodiment. FIG. 30 is a flowchart of an operation executed by the information presenting apparatus 600.

In the information presenting apparatus 600, when speech data associated with text data is included in an input document, the associated speech data is outputted so that the text is read aloud.

Text data included in document information 654 outputted by a document inputting unit 602 (S602) may be accompanied by associated speech data.

When the text data is accompanied by speech data, a layout analyzer 604 outputs data 656 including text blocks, position information of the respective text blocks in the document information, and the associated speech data to a poor-legibility-block extractor 608 (S604). The data structure of the data 656 including the text blocks, the position information of the respective text blocks, and the associated speech data is arbitrary. For example, as shown in FIG. 31, the data structure may include sets of the content of each text block, a start address and an end address representing a position of the text block in the document information as represented in the form of a one-dimensional array, and the content of speech data associated with the text block. The format of the speech data is arbitrary, and may be, for example, WAVE format or MP3 format. When the text data is not accompanied by speech data, predetermined data indicating the absence of speech data is used in place of speech data. The processing executed by the layout analyzer 604 is otherwise the same as the processing executed by the layout analyzer 104 in the first embodiment.

The poor-legibility-block extractor 208 outputs the data 656 including the text blocks, the position information thereof in the document information, and the associated speech data to a conversion-target extractor 614 (S608). The processing executed by the poor-legibility-block extractor 608 is otherwise the same as the processing executed by the poor-legibility-block extractor 108 in the first embodiment.

When the read-aloud-target text data extracted is accompanied by speech data, the conversion-target extractor 614 outputs the speech data as read-aloud-target speech data 676 to a speech outputting unit 616 (S614). The processing executed by the conversion-target extractor 614 is otherwise the same as the processing executed by the conversion-target extractor 114 in the first embodiment.

When the read-aloud-target speech data 676 is inputted from the conversion-target extractor 614, the speech outputting unit 616 converts the speech data into voice signal and outputs the voice signal via a loudspeaker or the like (S616). The processing executed by the speech outputting unit 616 is otherwise the same as the processing executed by the speech outputting unit 116 in the first embodiment.

In the information presenting apparatus 600 according to the sixth embodiment, when text data is accompanied by speech data in an input document, sound based on the associated speech data is output instead of using speech synthesis, so that more appropriate sound can be output. Furthermore, when it can be presumed that all text data in an input document is accompanied by speech data, speech synthesis function may be omitted.

Seventh Embodiment

An information presenting apparatus according to a seventh embodiment of the present invention will be described with reference to FIGS. 32 to 34. Parts or the like corresponding to those described in relation to the first embodiment will be designated by the same numerals, and descriptions thereof will be omitted.

Figure 32:
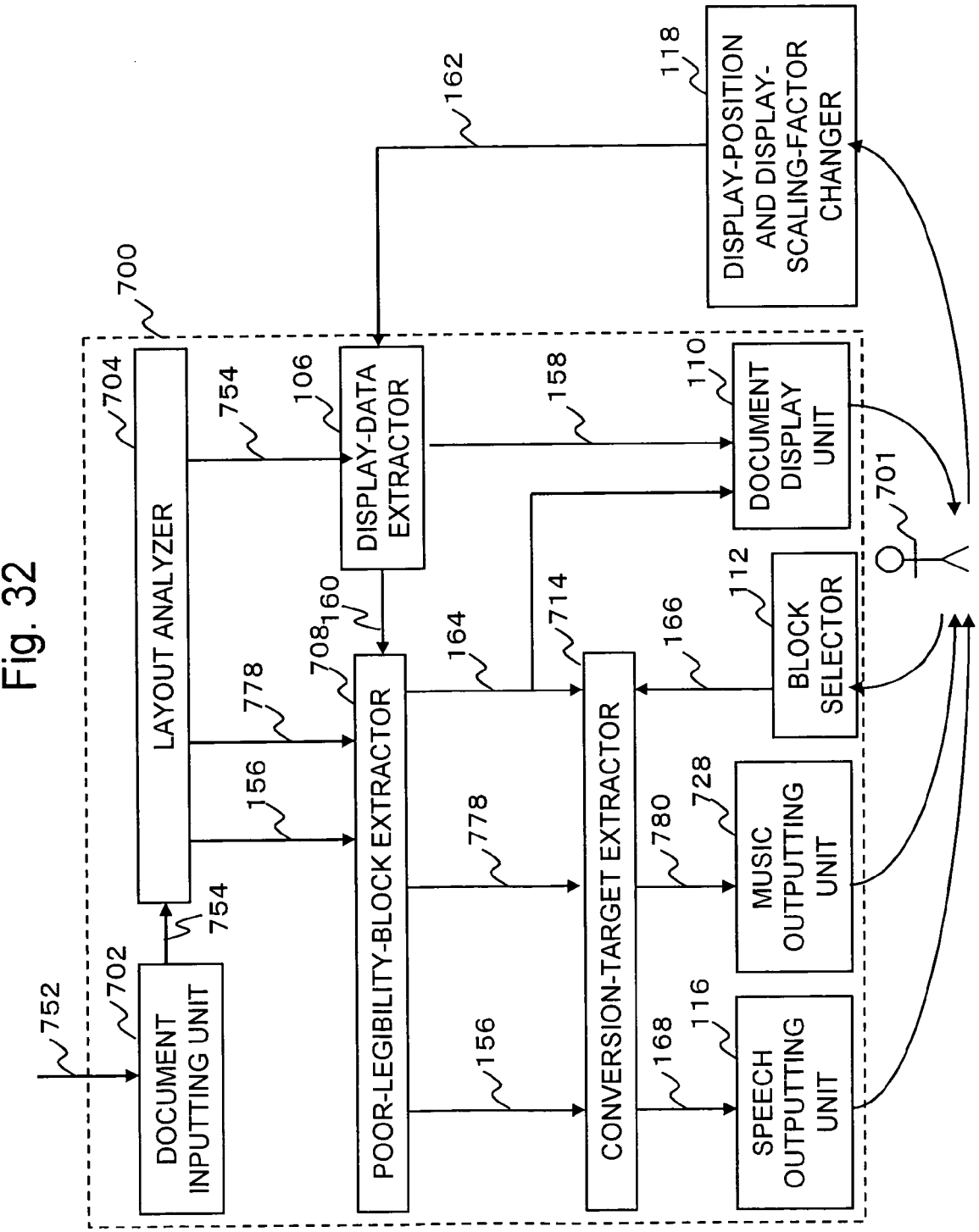
FIG. 32 is a schematic block diagram showing the construction of an information presenting apparatus according to a seventh embodiment of the present invention.
Figure 33:
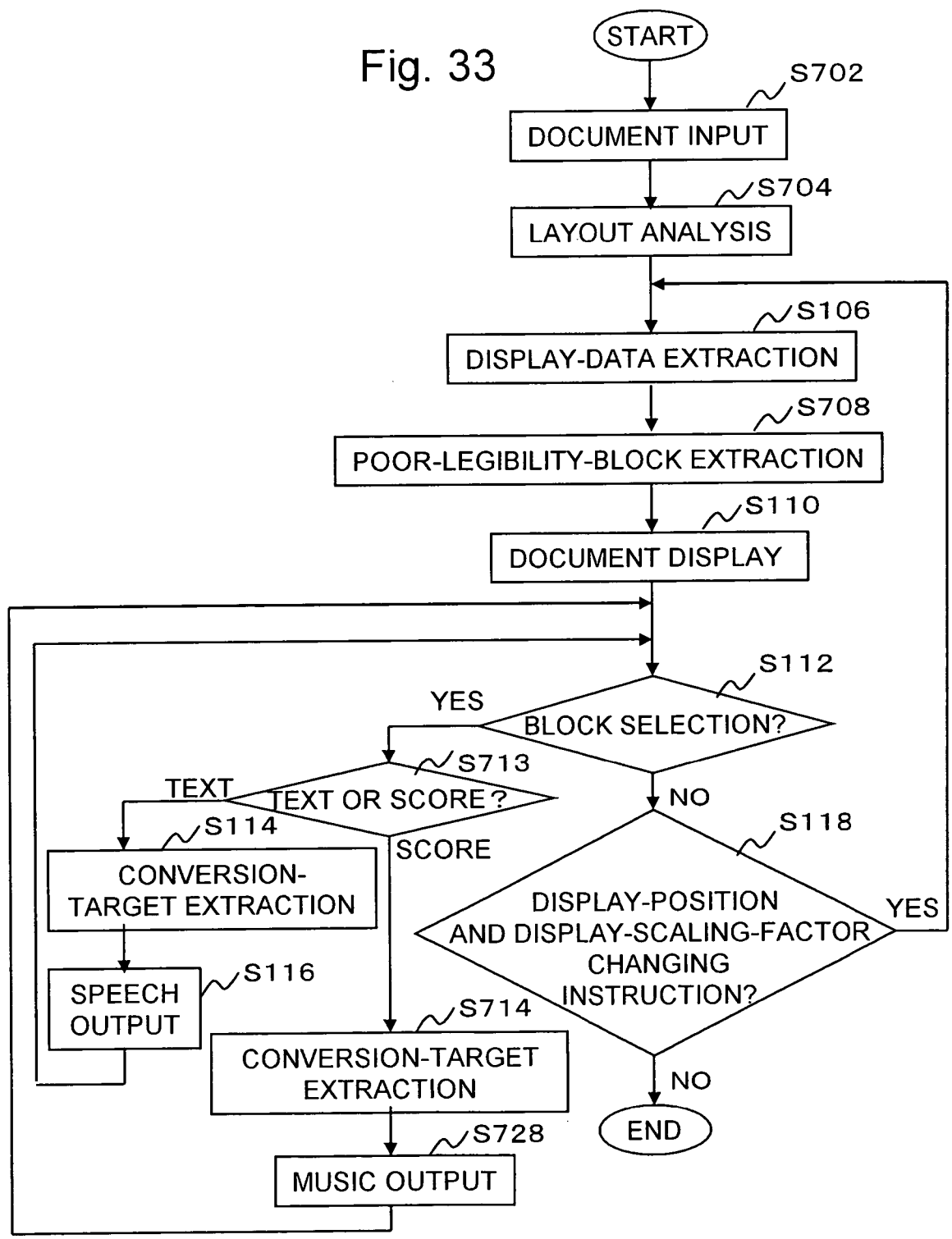
FIG. 33 is a flowchart of an operation executed by the information presenting apparatus according to the seventh embodiment.

FIG. 32 is a schematic block diagram showing the construction of an information presenting apparatus 700 according to the seventh embodiment. FIG. 33 is a flowchart of an operation executed by the information presenting apparatus 700.

In the information presenting apparatus 700, similarly to the case of text, musical score included in a document to be displayed on a screen is divided into some blocks, a block that is presumably poorly legible is estimated from the blocks, and those presumably poorly legible blocks are displayed as distinguished from other blocks, with block numbers respectively assigned thereto. When a user presses a numeric key corresponding to the block number of a score block of interest of the user, the content of the corresponding score block is played so that the performance is listened.

A document inputting unit 702 extracts document information 754 from a document 752 including either text or score or including both text and score, and outputs the document information 754 to a layout analyzer 704 (S702). It is assumed herein that the score data is accompanied by associated performance data.

The layout analyzer 704 extracts data 778 including score blocks, position information of the respective score blocks, and associated performance data from the document information 754 inputted from the document inputting unit 702, and outputs the data 778 to a poor-legibility-block extractor 708 (S704). The data structure of the data 778 including the score blocks, the position information of the score blocks, and the associated performance data is arbitrary. For example, as shown in FIG. 34, the data structure may include sets of the content of each score block, top-left coordinates and bottom-right coordinates of a position where the score block is to be placed in a two-dimensional layout of the document information, and the content of performance data associated with the score block. The format of the performance data is arbitrary, and may be, for example, MIDI format, WAVE format, or MP3 format. The processing executed by the layout analyzer 704 is otherwise the same as the processing executed by the layout analyzer 104 in the first embodiment.

The poor-legibility-block extractor 708 outputs data 778 including the score blocks, the position information of the respective score blocks, and the associated performance data, which is inputted from the layout analyzer 704, to the conversion-target extractor 714. Furthermore, based on the data 778 including the score blocks, the position information of the respective score blocks, and based on the data 160 including the display data and the position information of the display data in the document information, the poor-legibility-block extractor 708 extracts display blocks corresponding to individual score block of score to be displayed on the screen. Then, the poor-legibility-block extractor 708 calculates the stave-line interval of the score as displayed in each of the display blocks, classifies display blocks in which the stave-line interval is less than or equal to a predetermined interval as poor-legibility blocks, and assigns block numbers to the poor-legibility blocks. Then, the poor-legibility-block extractor 708 outputs the data 164 including the block numbers of the respective poor-legibility blocks, the position information of the respective poor-legibility blocks in the document information, and the position information of the respective poor-legibility blocks on the screen to the document display unit 110 and the conversion-target extractor 714 (S708).

The stave-line interval may be defined in any manner, for example, on the basis of the number of pixels or actual dimension between a pair of stave lines as displayed on the screen. The processing executed by the poor-legibility-block extractor 708 is otherwise the same as the processing executed by the poor-legibility-block extractor 108 in the first embodiment.

When the block selected by the block selector 112 is a score block (i.e., when step S713 results in SCORE), the conversion-target extractor 714 extracts performance data 780 to be played, based on the block number inputted from the block selector 112, the data 164 including the block number of the respective poor-legibility blocks and the position information of the respective poor-legibility blocks in the document information, which is inputted from the poor-legibility-block extractor 708, and the data 778 including the score blocks, the position information of the respective score blocks in the document information, and the associated performance data, and outputs the performance data 780 to a music outputting unit 728 (S714). The processing executed by the conversion-target extractor 714 when the selected block is a text block (i.e., when step S713 results in TEXT) is the same as that executed by the conversion-target extractor 114 in the first embodiment.

The music outputting unit 728 converts the performance data 780 to be played, which is inputted from the conversion-target extractor 714, into music, and outputs the music via a loudspeaker or the like (S728).

According to the seventh embodiment, poorly legible score in a document displayed can be readily selected, and the content of the score can be played for listening.

Although it has been described that the information presenting apparatuses according to the embodiments are particularly used in portable devices having small display screens, without limitation thereto, the information presenting apparatuses may be used in immovable devices or devices having large display screens.

The information presenting apparatuses according to the embodiments described above may be implemented in hardware or in computer software. For example, regarding the first embodiment, a program is created so that the functions of the layout analyzer 104, the display data extractor 106, the poor-legibility-block extractor 108, the document display unit 110, the block selector 112, the conversion-target extractor 114, and the speech outputting unit 116 shown in FIG. 3 can be executed by a computer, and the program is loaded in a memory of the computer and is executed, whereby the information presenting apparatus 100 shown in FIG. 3 is implemented. Similarly, the information presenting apparatuses according to the second to seventh embodiments can be implemented in computer software (programs).

As shown in FIG. 35, the programs for implementing the information presenting apparatuses according to the embodiments may be stored on a portable recording medium 832, such as a CD-ROM, a CD-RW, a DVD-R, a DVD-RAM, a DVD-RW, or a flexible disk, or on a storage device 836 that can be accessed via a communication line 834, or a storage device or a recording medium 838 such as a hard disk or a RAM of the computer system 830. The programs are loaded in a main memory and executed therein.

What is claimed is:

1. A hardware apparatus for presenting information, said hardware apparatus having a display screen comprising:
    a document inputting unit for inputting a document and extracting document information of said document, said document including a text block containing at least one character;
    a layout analyzer for extracting said text block from said document information, and for extracting position information of said text block in said document information;
    a display-data extractor for extracting display data from said document information, based on a current display position and a current display scaling factor;
    a poor-legibility-block extractor, including:
        a first sub-unit for extracting said text block from said display data as a display block, based on said text block and its position information in said document information, as well as said display data and its position information in said document information,
        a second sub-unit for classifying said display block as a poor-legibility block, when a size of said character in said display block on said display screen is less than or equal to a predetermined size, and
        a third sub-unit for assigning a block number to said poor-legibility block,
        said poor-legibility block being displayed on said display screen, an area of said poor-legibility block being displayed as distinguished from other areas;
    a document display unit for displaying said display data on said display screen:
    a block selector for selecting a block to be read aloud in accordance with user's instruction;
    a conversion-target extractor for extracting text data to be read aloud, based on said block number of said selected block, said block number of said poor-legibility block and its position information in said document information, as well as said text block and its position information in said document information;
    a speech outputting unit for converting said text data to be read aloud into voiced speech output;
    a read-aloud-target specification acceptor for accepting user's specification of text to be read aloud, and for extracting coordinate data of said text to be read aloud;

a minimum-size detector for detecting a value of a minimum size of said character in said text to be read aloud, based on said coordinate data and said display data; and a predetermined-size changer for changing said predetermined size into said minimum size of said character, when a current value of said predetermined size is less than said minimum size of said character, wherein said conversion-target extractor further extracts text data to be read aloud, based on said coordinate data, said text block and its position information in said document information, as well as said display data and its position information in said document information, and said poor-legibility-block extractor further extracts said poor-legibility block again according to said changed predetermined size.

2. A hardware apparatus for presenting information, said hardware apparatus having a display screen, comprising:

a document inputting unit for inputting a document and extracting document information of said document, said document including a text block containing at least one character;

a layout analyzer for extracting said text block from said document information, and for extracting position information of said text block in said document information;

a display-data extractor for extracting display data from said document information, based on a current display position and a current display scaling factor;

a poor-legibility-block extractor, including:
  a first sub-unit for extracting said text block from said display data as a display block, based on said text block and its position information in said document information, as well as said display data and its position information in said document information,
  a second sub-unit for classifying said display block as a poor-legibility block, when a size of said character in said display block on said display screen is less than or equal to a predetermined size, and
  a third sub-unit for assigning a block number to said poor-legibility block,
  said poor-legibility block being displayed on said display screen, an area of said poor-legibility block being displayed as distinguished from other areas;

a document display unit for displaying said display data on said display screen;

a block selector for selecting a block to be read aloud in accordance with user's instruction;

a conversion-target extractor for extracting text data to be read aloud, based on said block number of said selected block, said block number of said poor-legibility block and its position information in said document information, as well as said text block and its position information in said document information;

a speech outputting unit for converting said text data to be read aloud into voiced speech output;

a display-position and display-scaling-factor changer for changing a display position or a display scaling factor in accordance with user's instruction;

a minimum-size detector for detecting a value of a minimum size of said character in said display data but not included in said poor-legibility block, when said instruction to change said display scaling factor means enlargement, based on said display data before enlargement and its position information in said document information; and a predetermined-size changer for changing said predetermined size into said minimum size of said character, wherein said display-data extractor extracts display data from said document information, based on said current display position and said current display scaling factor, as well as said instruction to change said display position or said display scaling factor, and said poor-legibility-block extractor further extracts said poor-legibility block again according to said changed predetermined size.

3. The hardware apparatus of claim 1 or 2, further comprising:

a predetermined-size change acceptor for accepting user's instruction to change said predetermined size, and for extracting new predetermined size according to said instruction to change said predetermined size, wherein said poor-legibility-block extractor further extracting said poor-legibility block again according to said new predetermined size.

4. The hardware apparatus of claim 1 or 2, wherein said second sub-unit further classifies said display block including only parts of said text block as said poor-legibility block.

5. The hardware apparatus of claim 1 or 2, wherein said text block is accompanied by speech data, said text data being included in said document information extracted by said document inputting unit, said layout analyzer further extracts said speech data from said document information, said conversion-target extractor further extracts said speech data associated with said text data to be read aloud, and said speech outputting unit further converts said speech data into voiced speech output.

6. The hardware apparatus of claim 1 or 2, further comprising:

a music outputting unit for converting performance data into music sound output, wherein said document information includes a musical score block accompanied by said performance data, said layout analyzer further extracts said musical score block and its position information in said document information, as well as said performance data associated with said musical score block, said first sub-unit further extracts said musical score block from said display data as said display block, based on said musical score block and its position information in said document information, as well as said display data and its position information in said document information, said second sub-unit further classifies said display block as said poor-legibility block, when a stave-line interval in said display block on said display screen is less than or equal to a predetermined interval, and said conversion-target extractor further extracts said performance data associated with said musical score block to be played, based on said block number of said selected block, said block number of said poor-legibility block and said position information of said poor-legibility block in said document information, as well as said musical score block and its position information in said document information.

7. A non-transitory computer readable recording medium storing a program causing a computer to execute a process of presenting information, said computer having a display screen, said process comprising:

inputting a document including a text block containing at least one character;
extracting document information of said document;
extracting said text block from said document information;
extracting position information of said text block in said document information;
extracting display data from said document information, based on a current display position and a current display scaling factor;
extracting said text block from said display data as a display block, based on said text block and its position information in said document information, as well as said display data and its position information in said document information;
classifying said display block as a poor-legibility block, when a size of said character in said display block on said display screen is less than or equal to a predetermined size said poor-legibility block being displayed on said display screen, an area of said poor-legibility block being displayed as distinguished from other areas;
assigning a block number to said poor-legibility block;
displaying said display data on said display screen;
selecting a block to be read aloud in accordance with user's instruction;
extracting text data to be read aloud, based on said block number of said selected block, said block number of said poor-legibility block and its position information in said document information, as well as said text block and its position information in said document information;
converting said text data to be read aloud into voiced speech output;
accepting user's specification of text to be read aloud;
extracting coordinate data of said text to be read aloud;
detecting a value of a minimum size of said character in said text to be read aloud, based on said coordinate data and said display data;
changing said predetermined size into said minimum size of said character, when a current value of said predetermined size is less than said minimum size of said character;
extracting said text data to be read aloud, based on said coordinate data, said text block and its position information in said document information, as well as said display data and its position information in said document information; and
extracting said poor-legibility block again according to said changed predetermined size.

8. A non-transitory computer readable recording medium storing a program causing a computer to execute a process of presenting information, said computer having a display screen, said process comprising:
inputting a document including a text block containing at least one character;
extracting document information of said document;
extracting said text block from said document information;
extracting position information of said text block in said document information;
extracting display data from said document information, based on a current display position and a current display scaling factor;
extracting said text block from said display data as a display block, based on said text block and its position information in said document information, as well as said display data and its position information in said document information;
classifying said display block as a poor-legibility block, when a size of said character in said display block on said display screen is less than or equal to a predetermined size, said poor-legibility block being displayed on said display screen, an area of said poor-legibility block being displayed as distinguished from other areas;
assigning a block number to said poor-legibility block;
displaying said display data on said display screen;
selecting a block to be read aloud in accordance with user's instruction;
extracting text data to be read aloud, based on said block number of said selected block, said block number of said poor-legibility block and its position information in said document information, as well as said text block and its position information in said document information;
converting said text data to be read aloud into voiced speech output;
changing a display position or a display scaling factor in accordance with user's instruction;
detecting a value of a minimum size of said character in said display data but not included in said poor-legibility block, when said instruction to change said display scaling factor means enlargement, based on said display data before enlargement and its position information in said document information;
changing said predetermined size into said minimum size of said character; and
extracting said poor-legibility block again according to said changed predetermined size.

9. The non-transitory computer readable recording medium of claim 7 or 8, said process further comprising:
accepting user's instruction to change said predetermined size;
extracting new predetermined size according to said instruction to change said predetermined size; and
extracting said poor-legibility block again according to said new predetermined size.

10. The non-transitory computer readable recording medium of claim 7 or 8,
said process further comprising:
classifying said display block including only parts of said text block as said poor-legibility block.

11. The non-transitory computer readable recording medium of claim 7 or 8,
said text block being accompanied by speech data, said text data being included in said document information,
said process further comprising:
extracting said speech data from said document information;
extracting said speech data associated with said text data to be read aloud; and
converting said speech data into voiced speech output.

12. The non-transitory computer readable recording medium of claim 7 or 8, said process further comprising:
converting performance data into music sound output, said document information including a musical score block accompanied by said performance data;
extracting said musical score block and its position information in said document information, as well as said performance data associated with said musical score block;
extracting said musical score block from said display data as said display block, based on said musical score block and its position information in said document information, as well as said display data and its position information in said document information;

classifying said display block as said poor-legibility block, when a stave-line interval in said display block on said display screen is less than or equal to a predetermined interval; and extracting said performance data associated with said musical score block to be played, based on said block number of said selected block, said block number of said poor-legibility block and said position information of said poor-legibility block in said document information, as well as said musical score block and its position information in said document information.

* * * * *